US012614464B2

(12) United States Patent
Liu et al.

(10) Patent No.:     US 12,614,464 B2
(45) Date of Patent:          Apr. 28, 2026

(54) VEHICLE PLATOON INCENTIVE MECHANISM AND SYSTEM BASED ON DOUBLE AUCTION

(71) Applicant: GUIZHOU UNIVERSITY OF FINANCE AND ECONOMICS, Guiyang (CN)

(72) Inventors: Hai Liu, Guiyang (CN); Jinyu Wu, Guiyang (CN); Mingsen Deng, Guiyang (CN); Hongfa Ding, Guiyang (CN); Heling Jiang, Guiyang (CN)

(73) Assignee: GUIZHOU UNIVERSITY OF FINANCE AND ECONOMICS, Guiyang (CN)

( * ) Notice: Subject to any disclaimer, the term of this patent is extended or adjusted under 35 U.S.C. 154(b) by 147 days.

(21) Appl. No.: 18/407,497

(22) Filed: Jan. 9, 2024

(65) Prior Publication Data
US 2025/0124793 A1      Apr. 17, 2025

(30) Foreign Application Priority Data
Oct. 13, 2023    (CN) .......................... 202311328369.0

(51) Int. Cl.
*G08G 1/00*          (2006.01)
*B60W 60/00*         (2020.01)

(52) U.S. Cl.
CPC ............. *G08G 1/22* (2013.01); *B60W 60/001* (2020.02)

(58) Field of Classification Search
CPC ................. G08G 1/22; B60W 60/001; B60W 30/18163; G05D 1/0293; G05D 1/0295; H04W 4/44
See application file for complete search history.

(56) References Cited

U.S. PATENT DOCUMENTS

| | | | | |
|---|---|---|---|---|
| 2019/0073910 | A1* | 3/2019 | Boegel | ................... G08G 1/167 |
| 2019/0080373 | A1* | 3/2019 | Takoshima | ............. G06Q 10/04 |

(Continued)

OTHER PUBLICATIONS

Anirudh Kishore Bhoopalam, et al., Planning of truck platoons: A literature review and directions for future research, Transportation Research Part B, 2017, pp. 1-17.

(Continued)

*Primary Examiner* — Mirza F Alam
(74) *Attorney, Agent, or Firm* — Bayramoglu Law Offices LLC

(57)          ABSTRACT

A vehicle platoon incentive mechanism and system based on a double auction, a device, and a medium are provided. A highway system is conceived, where vehicles can be platooned and transmits their information to a controller. The controller searches for an optimal vehicle platoon to maximize a benefit of the vehicle platoon and redistribute the benefit among members in the vehicle platoon through a incentive mechanism to motivate a driver or a vehicle owner to form and maintain the optimal vehicle platoon. The incentive mechanism resolves a benefit conflict between vehicles through the benefit redistribution, thereby promoting formation of a stable and efficient vehicle platoon. The vehicle platoon incentive mechanism will make up for insufficient research on the vehicle platoon incentive mechanism. This mechanism can determine leader-follower positions and associated benefits, offering a potential solution to the instability in platooning behavior.

13 Claims, 12 Drawing Sheets

(56) References Cited

U.S. PATENT DOCUMENTS

| | | | |
|---|---|---|---|
| 2024/0160219 A1* | 5/2024 | Hwang | G05D 1/0295 |
| 2024/0272651 A1* | 8/2024 | Yamada | G05D 1/695 |
| 2024/0319729 A1* | 9/2024 | Switkes | G08G 1/127 |
| 2024/0388591 A1* | 11/2024 | Merchan | H04L 63/1425 |

OTHER PUBLICATIONS

Nils Boysen, et al., The identical-path truck platooning problem, Transportation Research Part B, 2018, pp. 26-39, vol. 109.

Christian Earnhardt, et al., Cooperative Exchange-Based Platooning Using Predicted Fuel-Optimal Operation of Heavy-Duty Vehicles, IEEE Transactions on Intelligent Transportation Systems, 2022, pp. 17312-17324, vol. 23, No. 10.

Shuo Feng, et al., String stability for vehicular platoon control: Definitions and analysis methods, Annual Reviews in Control, 2019, pp. 81-97, vol. 47.

Junyan Hu, et al., Cooperative Control of Heterogeneous Connected Vehicle Platoons: An Adaptive Leader-Following Approach, IEEE Robotics and Automation Letters, 2019, pp. 1-8.

Brian Ledbetter, et al., LIPs: A Protocol for Leadership Incentives for Heterogeneous and Dynamic Platoons, IEEE 43rd Annual Computer Software and Applications Conference (COMPSAC), 2019, pp. 535-544.

Veronika Lesch, et al., A comparison of mechanisms for compensating negative impacts of system integration, Future Generation Computer Systems, 2021, pp. 117-131, vol. 116.

Yongfu Li, et al., Integral-Sliding-Mode Braking Control for Connected Vehicle Platoon: Theory and Application, IEEE Transactions on Industrial Electronics, 2018.

Sebastian Van De Hoef, et al., Fuel-Efficient En Route Formation of Truck Platoons, IEEE Transactions on Intelligent Transportation Systems, 2017, pp. 1-11.

Wei Zhang, et al., Freight transport platoon coordination and departure time scheduling under travel time uncertainty, Transportation Research Part E, 2017, pp. 1-23, vol. 98.

Yang Zhou, et al., Stabilizing mixed vehicular platoons with connected automated vehicles: An H-infinity approach, Transportation Research Part B, 2019, pp. 1-19.

* cited by examiner

VEHICLE PLATOON INCENTIVE MECHANISM AND SYSTEM BASED ON DOUBLE AUCTION

CROSS REFERENCE TO THE RELATED APPLICATIONS

This application is based upon and claims priority to Chinese Patent Application No. 202311328369.0, filed on Oct. 13, 2023, the entire contents of which are incorporated herein by reference.

TECHNICAL FIELD

The present disclosure relates to the technical field of connected and automated vehicles (CAVs), and in particular, to a vehicle platoon incentive mechanism and system based on a double auction.

BACKGROUND

At present, with the rapid development of the CAV technology, vehicle platooning has become practical and feasible, that is, vehicles can travel closely at a short distance through virtual connections. This platooning method brings many advantages, including energy conservation, emission reduction, and more effective utilization of a road capacity. These advantages have been verified through extensive theoretical analysis, simulation research, and field experiments. In the vehicle platooning, when the vehicles travel closely enough to each other, a front vehicle reduces aerodynamic drag on a front surface of a rear vehicle, and generates higher pressure to provide propulsion for a leading vehicle, thereby achieving an energy conservation effect. In addition, smoother longitudinal acceleration brought by vehicle synchronization also helps to reduce fuel consumption. An experimental result shows that when a distance between vehicles is about 10 meters, an average fuel consumption of each vehicle in a vehicle platoon can be reduced by 10%. Therefore, the vehicle platooning technology has great potential in reducing fuel consumption and greenhouse gas emission of the transportation sector. Considering that the transportation sector accounts for 29% of a total energy consumption in China and 27% of a greenhouse gas emission in China, the vehicle platooning technology is of great significance for improving energy utilization efficiency and mitigating a climate change and other environmental problems.

However, although the vehicle platooning technology brings many advantages, it also faces some challenges. In the vehicle platoon, an arrangement of locations of different vehicles becomes very important, and different vehicles have different energy conservation effects. The platooning method slightly reduces drag effects of the first and last vehicles, and greatly reduces a drag effect of an intermediate vehicle. A recent on-site test conducted on a vehicle platoon including three heavy-duty trucks shows that a trailing vehicle saves most energy at a spacing of 12 meters, an intermediate vehicle saves most energy at a short spacing, and a leading vehicle saves least energy at different spacings. Such an unequal benefit distribution has sparked a potential conflict between vehicle drivers or owners. Especially when vehicles are owned by different individuals or private service providers, some vehicles are unwilling to join a cooperative vehicle platoon because they (such as a leading vehicle) benefit very little. Even if a vehicle platoon is formed, some vehicles may leave the vehicle platoon to travel alone or join another vehicle platoon due to a different benefit for each vehicle. This benefit conflict leads to instability of the vehicle platoon, which further affects efficiency of a traffic flow. However, the past research has mainly focused on optimal control, scheduling, or routing of the vehicle platoon, with relatively limited considerations on how to ensure willingness of a driver or a vehicle owner to form and maintain the vehicle platoon.

Research on the optimal control of the vehicle platoon mainly focuses on how to maintain the space required for the vehicle platoon and ensure the stability of the vehicle platoon. Research on this aspect focuses on car-following and gap control between vehicles to keep an appropriate distance between the vehicles. In research performed by Feng et al., they discussed "string stability" of the vehicle platoon. The string stability is crucial for achieving travel stability of the vehicle platoon. However, with different definitions and analytical methods proposed by different researchers for the string stability, there is a lack of comprehensive comparison. To fill these gaps, the research aims to clarify a relationship between fuzzy definitions and different analytical methods, providing a rigorous foundation for future research. In the research, a series of equivalences are summarized and discussed, and advantages and disadvantages of different analytical methods and definitions are explored, providing useful insights for selecting an actual analytical method for the vehicle platoon. Hu et al. propose a two-layer distributed control scheme to maintain string stability of a heterogeneous and connected vehicle platoon in one-dimensional motion, assuming that a leading vehicle remains a constant velocity. They first apply a feedback linearization method to transform nonlinear vehicle dynamics into a linear heterogeneous state space model, and then design a distributed adaptive control protocol to maintain an equal spacing between any adjacent vehicles while maintaining an expected longitudinal velocity of the entire vehicle platoon. The two-layer distributed control scheme only utilizes state information (such as relative distances, velocities, and accelerations) of adjacent vehicles, without a need to enable the leading vehicle to communicate directly with each subsequent vehicle, because an interaction topology of the vehicle platoon is designed as a spanning tree rooted in the leading vehicle. In research performed by Zhou et al., a car-following control strategy is proposed for a hybrid vehicle platoon including a CAV and a human-driven vehicle, to achieve the string stability. A string stability criterion is first established for the hybrid vehicle platoon to decompose the vehicle platoon into "subsystems". These subsystems are all sequential subsets of the vehicle platoon. The string stability is defined as "head-to-tail" string stability of all the subsystems. That is, in each subsystem, a magnitude of a disturbance is not amplified from the first vehicle to the last vehicle. Based on this definition, a distributed frequency-domain control strategy is proposed to increase a quantity of subsystems with a stable head-to-tail string, thus significantly dampening stop-and-go disturbances. Specifically, an H-infinity control problem is formulated, where a maximum disturbance "damping ratio" in each subsystem is minimized within a predominant acceleration frequency boundary of the human-driven vehicle. On the other hand, Li et al. propose a distributed integral sliding mode (ISM) control strategy for cooperative braking control of connected vehicles, with a focus on a car-following interaction between the vehicles. In the strategy, a linear controller considering a location, a velocity, and a braking force is proposed for the leading vehicle. For a subsequent vehicle, an ISM controller based on a constant time headway policy is developed to incorporate the car-following inter-action, a spacing error, a velocity difference, and external interference. In addition, convergence of the ISM controller is rigorously analyzed using the Lyapunov technique. Furthermore, the string stability of the vehicle platoon is analyzed using a transfer function method. Based on the above literature, the research on the optimal control of the vehicle platoon covers a plurality of aspects. Researchers have proposed different control strategies to achieve the string stability of the vehicle platoon. Although these control methods can theoretically achieve stable travel of the vehicle platoon, they neither involve a benefit distribution between the vehicle drivers or owners, nor make an economic consideration for forming and maintaining the vehicle platoon.

Another type of research focuses on scheduling and route problems of the vehicle platoon in a transportation network. This type of research focuses on how to consider travel efficiency of the vehicle platoon in route planning and how to schedule operation of the vehicle platoon in the transportation network to improve overall transportation efficiency. In research performed by Bhoopalam et al., a framework for classifying new transportation planning problems in a truck platoon is provided, an operational research model related to these problems in the literature is invested, and a future research direction is determined. An emphasis is made on challenges of scheduling and route planning in the truck platoon, providing guidance to address these problems. Research performed by Boysen et al. focuses on efficiency of the truck platoon, especially an impact of a vehicle platoon generation process on platooning efficiency in the case of a significant decrease in the aerodynamic drag as a vehicle spacing decreases. They study a basic scheduling problem on a single path and explore impacts of these neglected factors on the platooning efficiency, such as dissemination of a platooning technology, a maximum platoon length, and willingness of a truck to wait for a cooperative partner. Through differentiation of different problem characteristics (such as an objective function), they propose different problem settings, analyze computational complexity in detail, and obtain an efficient algorithm for studying impacts of the dissemination of the platooning technology, the maximum platoon length, and tightness of time windows on the truck platoon. Research results show that these factors significantly reduce a positive effect of the truck platoon, thereby reducing advantages of the truck platoon. Research performed by Zhang et al. models and analyzes scheduling and departure time planning problems of the vehicle platoon, and considers uncertainty of travel time. A framework for minimizing an expected cost is proposed, which considers a travel time cost, a schedule error penalty, and a fuel cost. It is found through research that the vehicle platoon is beneficial when an error of scheduled arrival time is less than a certain threshold. The uncertainty of the travel time usually lowers a cost threshold of the platooning technology. In a network, compared with a branch route, the vehicle platooning has less benefit on a merging route, which is caused by a delay at a merging point. This model provides valuable insights for advantages of the vehicle platoon in freight transportation planning. Research performed by Van De Hoef et al. considers how to coordinate planning of a large vehicle platoon to achieve a fuel-efficient vehicle platoon. They propose a scenario in which each truck in the vehicle platoon provides a start location, a destination, departure time, and an arrival deadline. A fuel-efficient plan needs to be made, including route and velocity configurations to ensure that the truck arrives on time. In this way, the trucks can meet and form a platoon in a common part of the route, thereby reducing fuel consumption. They formulate a combinatorial optimization problem that combines a plan involving only two vehicles. They indicate that for a large problem instance, it is difficult to resolve this problem. Therefore, they propose a heuristic algorithm and further optimize a result using a convex optimization technique. However, these researches often consider the vehicle platoon as a whole, ignore a benefit distribution within the vehicle platoon, and cannot resolve the behavioral instability and benefit conflict between individual vehicles.

In terms of resolving the benefit distribution problem in forming and maintaining the vehicle platoon, some research has proposed incentive mechanisms. These incentive mechanisms motivate the driver or the vehicle owner to participate in platooning by implementing currency transfer between members in the vehicle platoon. For example, research performed by Lesch et al. discusses how to motivate a vehicle to participate in the vehicle platoon, in order to avoid different benefits of vehicles at different locations in the vehicle platoon. They propose several strategies to compensate the vehicle directly or indirectly to make up for less benefits generated due to integration in a platooning system. The research integrates ideas from altruistic research, social sciences, organ donation, task scheduling on a computer, and professional cycling. In addition, it is found that an environmental characteristic, such as a quantity of lanes or a traffic density, affects performance of a compensation mechanism. They further discuss an identified challenge and how to apply a proposed idea to other systems that need to be self-integrated. In research performed by Ledbetter et al., a solution is provided for a problem that a leader abandons a leadership position in a dynamic and heterogeneous vehicle platoon. In this type of vehicle platoon, a vehicle is not motivated to assume a leadership role, but gains more benefits as a follower. Therefore, they propose a protocol named "Leadership Incentives for Platoons (LIPs)", which is suitable for a dynamically-platooned and heterogeneous vehicle. This protocol provides a payment system that motivates an individual to assume the leadership role, and is designed and implemented using a blockchain technology, to provide a distributed secure environment for an untrusted vehicle. They demonstrate application of the proposed protocol in a synthetic case study, and evaluate the protocol by analyzing time required for a platooning operation/transaction and conducting a usability test on a potential user group. Research performed by Earnhardt et al. focuses on expanding advantages of a heavy automated vehicle platoon by introducing an exchange-based incentive mechanism. They focus on two vehicle platoon incentive mechanisms: a "catch-up" mechanism that performs motivation along a designated highway route, and a mechanism that motivates rerouting to allow the platooning. By conducting research on an actual truck transportation route, they demonstrate that the advantages of the vehicle platoon can be expanded by introducing the exchange-based incentive mechanism. They propose three methods to explicitly calculate monetary value of exchange, in order to solve the problem of a decline in fuel economy for some participants in these scenarios. However, due to information asymmetry between member vehicles in the vehicle platoon, it is difficult to effectively implement these mechanisms in practice. Therefore, there is a need for a incentive mechanism that can perform point-to-point coordination between the vehicles, resolve the benefit distribution problem, and ensure behavioral stability and overall economic efficiency of the vehicle platoon.

Based on the above analysis, the prior art has following problems and shortcomings: The existing CAV technology cannot handle a benefit conflict between different vehicles, resulting in instability of the vehicle platoon and affecting the efficiency of the traffic flow.

SUMMARY

In order to resolve the problems in the prior art, the present disclosure provides a vehicle platoon incentive mechanism and system based on a double auction.

In order to achieve the above objectives, the present disclosure provides a vehicle platoon incentive mechanism based on a double auction. The vehicle platoon incentive mechanism based on a double auction provides a feasible incentive mechanism, and adopts a highway system. A vehicle can be platooned and transmits its information to a controller. The controller searches for an optimal vehicle platoon to maximize a benefit of the vehicle platoon and redistribute the benefit among members in the vehicle platoon through the incentive mechanism to motivate a driver or a vehicle owner to form and maintain the optimal vehicle platoon. The vehicle platoon is implemented in the highway system, and the controller is used to maximum the benefit of the vehicle platoon and redistribute the benefit to motivate the driver or the vehicle owner to form and maintain the optimal vehicle platoon, thereby promoting formation of a stable and efficient vehicle platoon.

Further, the vehicle platoon incentive mechanism based on a double auction includes the following steps:

step 1: obtaining a non-zero positive bid and a non-zero positive asking price by using a bidding matrix and a price asking matrix;

step 2: determining a candidate transaction set based on a potential transaction, where a candidate transaction involves a platoon follower (PF) and a platoon leader (PL) that meet some auction criteria/conditions; and retaining only a PL with maximum utility, and eliminating a remaining candidate PL to perfect the candidate transaction set to obtain a successful transaction set; and step 3: determining a fee charged to the PF, and a payment/a reward/an incentive provided to a product list.

Further, the vehicle platoon incentive mechanism based on a double auction further includes a vehicle platoon allocation process of allocating/mapping the PL and the PF, which includes: first obtaining the non-zero positive bid and the non-zero positive asking price by using the bidding matrix B and the price asking matrix A; then determining the candidate transaction set (T) based on the potential transaction (i,j,k), where the candidate transaction involves the PF and the PL that meet the some auction criteria/conditions; and retaining only the PL with the maximum utility, and eliminating the remaining candidate PL to further perfect the candidate transaction set to obtain the successful transaction set ($W^T$); and finally determining the fee charged to the PF, and the payment/reward/incentive P provided to the PL.

Further, the vehicle platoon incentive mechanism based on a double auction further includes collecting, by the candidate transaction, a bid and an asking price from the PF and the PL, and creating the bidding matrix and the price asking matrix, where for selection of the PF and the PL, a path set affects decisions of the bid and the asking price, and for any task, different bids and asking prices are selected based on different path sets; and however, an impact of the path set on bidding and price asking processes is task specific.

Further, the vehicle platoon incentive mechanism based on a double auction further includes determining the candidate transaction set (T) and a winning PF by calling Function (F,L,B,A), with a PF set F, a PL set L, the bidding matrix B, and the price asking matrix A as inputs, which includes: firstly creating a new PF set M from the original PF set F where for any PF $pf_i \in F$, the set M includes $$pf_k^j$$

only when $$B_i^j > 0,$$

which means that the PF $pf_i \in F$ appears in the M only when a bid $R_j \in R$ is a non-zero positive number; and then sorting PFs in the M in a non-increasing order based on the non-zero positive bid to construct a list List[M']($1 \leq i \leq n$), $pf_1 \geq pf_2 \geq \ldots \geq pf_n$;

similarly, for the PL, creating a new PL set N from the original PL set L, where for any PL $pl_k \in L$, the set N includes $$pl_k^j$$

only when $$A_k^j > 0;$$

and sorting, by the present disclosure, PLs in the N in a non-decreasing order based on the non-zero positive asking price to construct a list List[N']($1 \leq k \leq m$), $pl_1 \leq pl_2 \ldots \leq pl_m$; and determining an asking price threshold, where the asking price threshold is an asking price of a median PL in N' and represented by $A_\lambda$, where $\lambda = \lceil (m+1)/2 \rceil$;

where the asking price threshold $A_\lambda$ is used to construct a set $$M_q'$$

that includes the first q PFs in M', such that $B_q \geq A_\lambda$; for each $$pf_i^j \in M_q',$$

if there is one $$A_k^j$$

that satisfies $$A_k^j < A_\lambda,$$

a PL $pl_i$ is added to a newly created set $$Z_i^j$$

including all PLs $$pl_k^{ij} \in N$$

that meet a condition $$A_k^j < A_\lambda,$$

and the set $$Z_i^j$$

includes all PLs won by the PF $$pf_i^j;$$

and for each combination $$\left( pf_i^j \in M_q', pl_k^j \in N' \right)$$

that meets the above condition, one transaction (i,j,k) is created and added to the candidate transaction set T, and at the end of a cycle, each $Z_i^j$ is merged into a new set Z.

Further, for a successful transaction according to the vehicle platoon incentive mechanism based on a double auction, after a candidate transaction stage, Function(Z,T) is called to confirm the successful transaction, only one of PLs won by a PF $$pf_i^j \text{ in } Z_i^j$$

needs to be retained through elimination, and an auctioneer only retains a PL with maximum total utility, where PLs in the $$Z_i^j$$

are first sorted in a non-decreasing order based on asking prices of the PLs, that is, $$\text{List}\left[ Z_{ij}^{(s)} \right] (1 \le s \le m), \; pl_1 \le pl_2 \le \; \ldots \; pl_s,$$

and when an end of the list is approached, utility of the PL in a real auction decreases; finally, the auctioneer retains a first PL in a sorted list $$Z_{ij}^{(s)},$$

while a remaining candidate PL is eliminated; and after the candidate PL is eliminated, a remaining transaction in the T is considered as the successful transaction $W^T$; and based on the successful transaction set $W^T$, it is assumed that the first q buyers in M' are final winning buyers, a bid $B_q$ of a $q^{th}$ buyer is used as a fee $$P_{ij}^{(f)}$$

required to be paid by each winning buyer, and a total return received by a seller cannot exceed a total system budget, that is, $$P_{kj}^{(l)} \le qB_q,$$

and the auctioneer calculates, according to $$P_{kj}^{(l)} \le qB_q,$$

the return $$P_{kj}^{(l)}$$

received by the winning seller.

Another objective of the present disclosure is to provide a computer device. The computer device includes a memory and a processor. The memory stores a computer program, and when the computer program is executed by the processor, the processor executes the vehicle platoon incentive mechanism based on the double auction.

Another objective of the present disclosure is to provide a computer-readable storage medium. The computer-readable storage medium stores a computer program, and when the computer program is executed by a processor, the processor executes the vehicle platoon incentive mechanism based on the double auction.

Another objective of the present disclosure is to provide an information data processing terminal. The information data processing terminal is configured to implement the vehicle platoon incentive mechanism based on the double auction.

Another objective of the present disclosure is to provide a vehicle platoon incentive system based on a double auction, which is based on the vehicle platoon incentive mechanism based on the double auction, and includes:

a matrix processing module configured to obtain a non-zero positive bid and a non-zero positive asking price by using a bidding matrix and a price asking matrix;

a transaction set obtaining module configured to determine a candidate transaction set based on a potential transaction, where a candidate transaction involves a PF and a PL that meet some auction criteria/conditions; and retain only a PL with maximum utility, and eliminate a remaining candidate PL to perfect the candidate transaction set to obtain a successful transaction set; and a result output module configured to determine a fee charged to the PF, and a payment/a reward/an incentive provided to a product list.

In combination with the above technical solutions and the technical problems to be resolved, the present disclosure has following advantages and positive effects:

Firstly, the present disclosure is intended to provide a feasible incentive mechanism to address behavioral instability of a vehicle platoon. The vehicle platoon is implemented in a highway system, and a controller is used to maximize a benefit of the vehicle platoon and redistribute the benefit to motivate a driver or a vehicle owner to form and maintain an optimal vehicle platoon, thereby promoting formation of a stable and efficient vehicle platoon. This incentive mechanism makes up for insufficient research on a behavior of the vehicle platoon to promote the formation and behavioral stability of the vehicle platoon, and determine locations of a leader and a follower and related benefits thereof.

Secondly, the present disclosure conceives the highway system. In the highway system, the vehicle can be platooned and transmits its information to the controller. The controller searches for the optimal vehicle platoon to maximize the benefit of the vehicle platoon and redistribute the benefit among members in the vehicle platoon through the incentive mechanism to motivate the driver or the vehicle owner to form and maintain the optimal vehicle platoon. This incentive mechanism resolves a benefit conflict between vehicles through the benefit redistribution, thereby promoting the formation of the stable and efficient vehicle platoon. The research in the present disclosure makes up for insufficient research on the vehicle platoon incentive mechanism and is expected to provide important guidance and improvement for platooning of a further partially-automated or private fully-automated vehicle.

The incentive mechanism proposed in the present disclosure is designed using a double-auction game. The game can handle a plurality of PFs and PLs, and also meets all ideal attributes (such as authenticity, computational efficiency, budget balance, and personal rationality) of an auction. This makes it impossible for both the PF and the PL to directly control the incentive mechanism. On the contrary, auctioning is performed by a trustworthy third party (namely, auctioneer), which helps the PF and the PL to benefit equally.

Unlike an existing incentive mechanism in a vehicle platooning system, the proposed model introduces a novel pricing mechanism. In addition, compared with an existing method, different vehicle platoon matching mechanisms are provided. Specifically, in the present disclosure, a vehicle platoon matching process is essentially bidirectional matching between the PF and the PL, to achieve high system efficiency and all required attributes.

In summary, although existing research has made some progress in optimal control, scheduling, routing, and a incentive mechanism of the vehicle platoon, there are still challenges in addressing the behavioral instability and a benefit distribution problem of the vehicle platoon. Therefore, the present disclosure is intended to propose a incentive mechanism based on a double auction, to resolve the benefit distribution problem through point-to-point coordination between individual vehicles, help to form and maintain a cooperative vehicle platoon, and thus maximize efficiency of the entire system. Based on an overview made by the present disclosure for the existing research, the present disclosure provides a necessary theoretical basis for designing and analyzing the incentive mechanism based on the double auction in subsequent part.

Thirdly, auxiliary evidences for inventiveness of the present disclosure are further reflected in following important aspects:

(1) An expected income and a commercial value of the present disclosure after transformation are as follows:

Market demand: CAV field. With the development of automotive technologies, a vehicle platooning technology has attracted widespread attention as a solution that can improve energy efficiency, reduce emissions, and improve road capacity utilization. The vehicle platoon incentive mechanism fills a research gap in the behavior of the vehicle platoon, and avoids the benefit conflict between the vehicles, thus helping to form and maintain the vehicle platoon. It is expected that with the popularization of an intelligent transportation system, a demand for the vehicle platooning technology will further increase, because the vehicle platooning technology is expected to reduce traffic congestion, improve road safety, and reduce an energy consumption and an environmental impact.

Product differentiation: As innovative solutions, the technical solutions of the present disclosure have a significant advantage compared with a traditional platooning technology. The technical solutions of the present disclosure can balance a benefit between different vehicles and ensure stability and efficiency of the vehicle platoon. The product differentiation lies in its unique incentive mechanism, which can achieve fair task allocation between the vehicles and encourage the driver or the vehicle owner to actively participate in the behavior of the vehicle platoon. This differentiation is expected to attract attention from an automaker, an intelligent transportation system developer, and a vehicle platoon operator, thereby becoming a unique product in the market.

Production cost: The technical solutions of the present disclosure have a relatively low cost of producing software and hardware components, especially compared with a traditional hardware solution. This is because the mechanism mainly relies on a communication technology, an algorithm, and an intelligent control system. Compared with a traditional physical device, this technical solution has a low maintenance cost because this technical solution does not involve a large quantity of mechanical components or sensors, but is mainly based on software and data analysis. Due to a low cost and a low threshold for production and deployment, the technology of the present invention can easily enter the market and quickly respond to a growth of the market demand.

Comprehensively considering the market demand, the product differentiation, and the product cost, the technical solutions of the present disclosure are expected to achieve success in the market. The technical solutions of the present disclosure not only meet the market demand, but also provide a commercial competitive advantage based on the product differentiation and the low production cost. The technical solutions of the present disclosure are expected to promote the development of the intelligent transportation system, improve the energy efficiency, reduce the emissions, improve a road traffic condition, and have a positive impact on the entire transportation industry, while bringing considerable commercial value to related enterprises.

(2) The present disclosure fills a technical gap in the industry at home and abroad.

Cutting-edge nature of technical research: The vehicle platoon incentive mechanism based on the double auction in the present disclosure is at a cutting edge of the technical research. In the technical fields of CAVs and autonomous driving, the vehicle platoon has been considered as an important component of a future transportation system. However, the benefit distribution and the incentive mechanism of the vehicle platoon have always been important challenges. The present disclosure provides an innovative method for redistributing the benefit among the members in the vehicle platoon by means of the double auction, thereby addressing the behavioral instability of the vehicle platoon. The innovative method is supported by theoretical foundations of economics and a game theory, and provides a new idea for addressing the behavioral instability of the vehicle platoon. The vehicle platoon incentive mechanism based on the double auction has not yet been widely involved in the technical research in the industry at home and abroad. Therefore, a cutting-edge nature of the present disclosure lies in leading a research direction in this field.

Leading technical innovation: The technical innovation of the present disclosure lies in design and implementation of the incentive mechanism of the present disclosure. A double-auction mechanism makes the benefit distribution fairer and more transparent, ensuring stability and efficiency of the vehicle platoon. In addition, the double-auction mechanism also meets all the ideal attributes of the auction, such as the authenticity, the computational efficiency, the budget balance, and the personal rationality, which is rare in other incentive mechanisms. Compared with a traditional vehicle platooning technology, the present disclosure has a leadership in effectively avoiding the benefit conflict between the vehicles and encouraging the driver or the vehicle owner to actively participate in the behavior of the vehicle platoon, thus forming and maintaining the optimal vehicle platoon. The leading technical innovation gives the present disclosure a competitive advantage in international competition and is expected to play an important role in the development of a future intelligent transportation system.

Wide application range: The technical solutions of the present disclosure are widely applied. The vehicle platooning technology can be applied in a plurality of fields such as the intelligent transportation system, logistics transportation, and urban traffic management. The vehicle platooning technology helps to reduce the traffic congestion, improve the road safety, reduce a fuel consumption and emissions, and improve efficiency of a transportation system. In addition to being applied to autonomous vehicles, the technical solutions of the present disclosure can also be extended to the platooning of the partially-automated or private fully-automated vehicle, providing important guidance and improvement for the future transportation system. Traffic management departments, intelligent transportation system developers, logistics companies, and vehicle platoon operators at home and abroad are expected to benefit from the technical solutions of the present disclosure, as they can utilize the technical solutions of the present disclosure to improve transportation efficiency, reduce costs, and improve the road safety.

In summary, the vehicle platoon incentive mechanism based on the double auction fills the technical gap in the industry at home and abroad, and has the cutting-edge nature, the leading technical innovation, and the wide application range. This innovative method is expected to promote the development of the intelligent transportation system and the vehicle platooning technology, bring positive impacts to the society, economy, and environment, and provide new business opportunities for related industries.

(3) The present disclosure resolves a technical problem that people have been eager to resolve but has not been successfully resolved:

Degree of problem resolving: The present disclosure is mainly intended to resolve the benefit conflict and instability problems of the vehicle platoon. These problems have always been important challenges in the fields of autonomous driving and intelligent transportation, because a benefit difference between different vehicles can make it difficult to form and maintain the vehicle platoon, thereby affecting the efficiency of the transportation system. By introducing the incentive mechanism based on the double auction, the present disclosure resolves these long-standing problems by redistributing the benefit among the members in the vehicle platoon. The problem resolving of this degree is significant as it helps improve traffic efficiency, reduce the energy consumption, reduce the emissions, and ultimately improve the road traffic condition.

Reliability of a technical achievement: The present disclosure is based on the game theory, an auction theory, and an intelligent control technology, which have been widely studied and verified. As a mature mechanism design method, the double auction is reliable and stable. Based on a rigorous theoretical foundation and mathematical modeling, the present disclosure ensures reliability of the incentive mechanism to ensure fair and reasonable task allocation among the members in the vehicle platoon. In this way, the driver or the vehicle owner has a motive to participate in the vehicle platoon, thereby achieving the reliability of the technical achievement.

Practicality of the technical achievement: The present disclosure not only is theoretically feasible, but also has a potential for an actual application. The present disclosure can be applied in a plurality of fields such as the intelligent transportation system, the autonomous vehicle, the logistics management, and the urban traffic management. Practicality of the present disclosure is also reflected in compatibility between the present disclosure and the prior art. The present disclosure can seamlessly integrate with an existing traffic management system, vehicle control system, and communication technology to provide a convenient way for a real-world application. By improving the efficiency of the transportation system, reducing the energy consumption and the emissions, and improving the road safety, the present disclosure has broad social and economic significance and enhances its practicality.

To sum up, the present disclosure resolves the benefit conflict and instability problems of the vehicle platoon. The present disclosure provides the innovative solutions, which has high reliability and practicality and is expected to have a profound impact on the future intelligent transportation system and autonomous driving.

(4) The present disclosure overcomes following technical prejudice:

Eliminating a limitation of a traditional thinking way: In the field of the vehicle platooning technology, the traditional thinking way usually focuses on physical car-following and control between the vehicles, but often neglects economic and behavioral motives of the driver or the vehicle owner. The present disclosure changes this traditional thinking way by introducing the incentive mechanism based on the double auction. The present disclosure shifts attention from simple vehicle control to a behavior and benefit allocation of the driver or the vehicle owner, thus achieving a more comprehensive solution. By eliminating the limitation of the traditional thinking way, the technical solutions of the present disclosure overcome the technical prejudice in the field of the vehicle platooning technology, and provide a new idea for a more comprehensive and efficient platoon behavior.

Addressing a commonly accepted shortcoming in the industry: One of commonly accepted shortcomings in the vehicle platooning field is that it is difficult to avoid the benefit conflict between the vehicles. This problem is widely present in the industry, but often overlooked or not completely resolved. The technical solutions of the present disclosure specifically address this problem. Based on the double-auction mechanism, the present disclosure resolves the long-standing problem by redistributing the benefit among the members in the vehicle platoon. This solution is not only theoretically effective, but also validated in the actual application. Therefore, the technical prejudice in the industry is overcome, and a feasible solution is provided.

Crossing obstacles between different technical fields: The technical solutions of the present disclosure involve a plurality of fields, including the game theory, the auction theory, the intelligent control technology, and the intelligent transportation system. There are different professional terms, methods, and thinking ways in these fields. By integrating these different technical fields into each other, the present disclosure has successfully overcome the obstacles between these fields. The present disclosure combines the game theory and the auction theory with the intelligent transportation system and the intelligent control technology to form a comprehensive solution. With such a capability to span different technical fields, the present disclosure can be applied in a plurality of fields, and provide a powerful tool for resolving a complex actual problem.

In summary, the present disclosure successfully overcomes the technical prejudice by eliminating the limitation of the traditional thinking way, addressing the shortcoming in the industry, and overcoming the obstacles between the different technical fields. The present disclosure provides a new and comprehensive solution, which brings a new idea to the field of the vehicle platooning technology, and provides strong support for resolving complex traffic management and autonomous driving problems.

Fourthly, the vehicle platoon incentive mechanism based on a double auction brings a plurality of significant technical advancements:

1. Improving road usage efficiency: Based on the vehicle platoon, road resources can be more effectively utilized, the traffic congestion can be reduced, and the road usage efficiency can be improved. The platooning can reduce a safe distance between the vehicles and also alleviate generation of a "congestion wave" (that is, when a vehicle slows down, rear vehicles need to continuously slow down).

2. Energy saving and emission reduction: The platooning can reduce air resistance. Especially, the PF can travel in an airflow formed by the PL, thereby significantly reducing a fuel consumption, saving energy, and also reducing carbon emissions. This has a positive impact on environmental protection.

3. Optimizing path selection: Through centralized control, the path selection can be optimized for the vehicle based on global information, thereby avoiding a vehicle conflict, reducing an unnecessary driving distance and time, and improving travel efficiency.

4. Enhancing traffic safety: The vehicles in the vehicle platoon can share travel information, such as a velocity, a direction, and a route, which helps to prevent a traffic accident and improve the travel safety.

5. Financial incentive: By means of the double auction, an economic incentive can be provided for the vehicles in the vehicle platoon. For the PL, a reward can be obtained by leading the vehicle platoon. For the PF, an actual economic benefit can be achieved by saving the fuel consumption and time.

6. Promoting the development of the autonomous driving technology: This method requires communication and coordination between the vehicles, which provides an actual application scenario and requirement for the development of the autonomous driving technology, and helps to promote further research and development of the autonomous driving technology.

DETAILED DESCRIPTION OF THE EMBODIMENTS

To make the objectives, technical solutions, and advantages of the present disclosure clearer and more comprehensible, the present disclosure will be further described below in detail in conjunction with embodiments. It should be understood that the specific embodiments described herein are only intended to explain the present disclosure and are not intended to limit the present disclosure.

Figure 1:
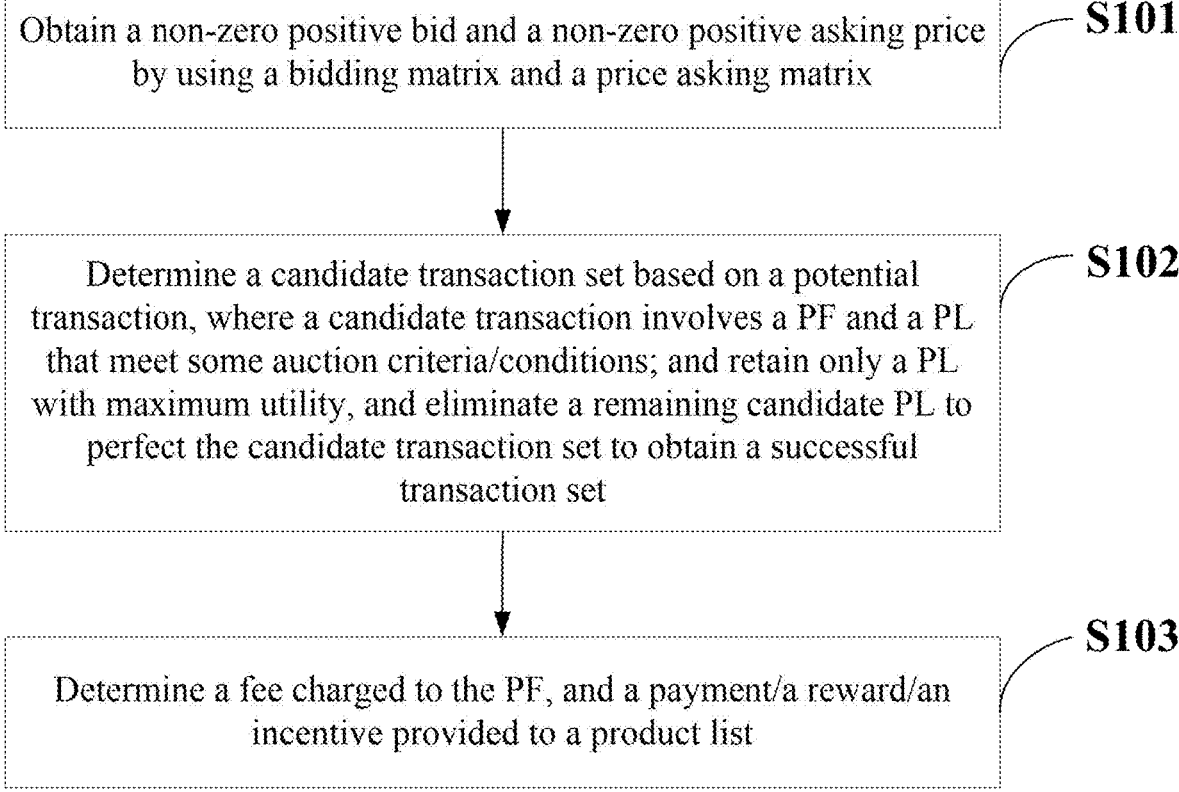
FIG. 1 is a flowchart of a vehicle platoon incentive mechanism based on a double auction according to an embodiment of the present disclosure.

As shown in FIG. 1, a vehicle platoon incentive mechanism based on a double auction according to an embodiment of the present disclosure includes the following steps:

S101: A non-zero positive bid and a non-zero positive asking price are obtained by using a bidding matrix and a price asking matrix.

S102: A candidate transaction set is determined based on a potential transaction, where a candidate transaction involves a PF and a PL that meet some auction criteria/conditions; and only a PL with maximum utility is retained, and a remaining candidate PL is eliminated to perfect the candidate transaction set to obtain a successful transaction set.

S103: A fee charged to the PL, and a payment/a reward/an incentive provided to a product list are determined.

Embodiment 1

1. System Model

The present disclosure researches an auction scenario of a vehicle platoon service. A system is constituted by a plurality of entities, including a certification authority (CA), a service provider (SP), an SP, a PL, and a PF. The following describes each entity in detail, including a function and a characteristic of each entity, and a role of each entity in a piloting task allocation market.

(1) CA: The CA is responsible for registering an SP, a road side unit (RSU), and a vehicle, and issuing a public/private key pair for each vehicle. All vehicles need to be registered with the CA before entering the system. The CA is considered completely trustworthy.

(2) SP: With high storage and computing capabilities, the SP is responsible for managing establishment and dissolution of a vehicle platoon, and allocation of a new PL. The SP grasps global RSU node information and processes a request submitted by each RSU node.

(3) RSU: The RSU is connected to the SP or the CA through a wired line and a secure channel to provide a wireless connection for the vehicle. The RSU acts as a data relay in the system to transmit a query of the vehicle, a response of the PL, and an information update to the CA or the SP. The RSU is widely deployed along a road and in a rest area to ensure that the vehicle can update information in a timely manner. The RSU verifies legitimacy of the vehicle, collects a request of the vehicle, and forwards the request to the SP. In addition, the RSU node has a storage capability, a distribution capability, and a powerful computing capability, and can migrate some computing tasks to reduce an energy consumption, especially for an application with strong interaction with the SP, to improve real-time performance. The RSU can also achieve spatiotemporal anonymity for a user, to enhance enthusiasm of a participant and effectively protect user privacy.

(4) Vehicle: Vehicle set $V=v_1, v_2, v_3, \ldots, v_n$ represents highly mobile nodes. Each vehicle is equipped with an on-board unit (OBU) to communicate with another vehicle or the RSU. The vehicle can choose to travel independently or join the vehicle platoon. The PL is responsible for commanding the entire vehicle platoon, while the PF can choose to join the vehicle platoon to arrive at a destination in a more comfortable and energy-efficient manner. The PF joins the vehicle platoon after identity verification. The PF receives a command from the PL and communicates with the PL through a V2V connection. At the end of a travel, the PF submits a driving report to the RSU and pays a fee to the PL. The PL has a significant impact on operation and a road condition of the entire vehicle platoon. There are two types of vehicles: the PF and the PL, which are corresponding to a buyer and a seller respectively.

2. Incentive Model

The incentive model of the present disclosure is described herein to illustrate an auction process of the system. An auction mechanism proposed by the present disclosure involves three participants: the buyer (PF), the seller (PL), and an auctioneer (SP). The PF makes a bid to the PL for a path of the PF, while the PL submits its lowest asking price. A specific description is as follows:

(1) PF (buyer): The present disclosure represents all PF sets as F. Each vehicle bids on its path. A bid of each PF $pf_i \in F$ for each path $R_j$ is expressed as a vector as follows:

$$B_i = \left( B_i^1, B_i^2, \ldots, B_i^m \right)$$

In the above formula, $$B_i^j$$

represents a highest bid of the vehicle for the path $R_j$. Therefore, $$B_i^j$$

may be 0 (indicating that the vehicle does not bid on the path $R_j$) or a positive real number (indicating the highest bid of the vehicle for the path $R_j$).

A valuation of each PF $pf_i \in F$ is expressed as a vector as follows:

$$V_i = \left( V_i^1, V_i^2, \ldots, V_i^m \right)$$

In the above formula, $$V_i^j$$

represents a valuation of a journey of the $Pf_i$ on the $R_j$. In the auction mechanism, the $$B_i^j$$

is not necessarily equal to the $$V_i^j.$$

As an auction center, the RSU determines final fee $$P_i^{(f)}$$

that the buyer pf$_i$ needs to pay.

(2) PL (seller): The present disclosure represents all PL sets as L. Each PL submits its lowest asking price based on its route. In the present disclosure, an asking price of PL pl$_k \in$ L for each path R$_j$ is expressed as a vector as follows:

$$A_k = \left(A_k^1, A_k^2, \ldots, A_k^m\right)$$

In the above formula, $$A_k^j$$

represents a lowest asking price of the PL Pl$_k$ for the path R$_j$. Similarly, the $$A_k^j$$

may be 0 or a positive real number.

For each PL $$pl_k \in L, C_k^j$$

represents an actual piloting cost on the R$_j$. For all path sets in R, an actual piloting cost of the pl$_k$ is expressed as a cost vector:

$$C_k = \left(C_k^1, C_k^2, \ldots, C_k^m\right)$$

It should be noted that $$V_{k,j} C_k^j \leq A_k^i.$$

In the auction mechanism, the $$A_k^j$$

is not necessarily equal to the $$C_k^j.$$

Final return $$P_k^{(l)}$$

of the seller pl$_k$ depends on the RSU.

(3) SP (auctioneer): As a trustworthy third-party organization, the SP is responsible for hosting an auction activity. When the PF set F, the PL set L, bidding matrix B, and price asking matrix A are given, the SP determines winning PF set F$_w \subseteq$ F and winning PL set L$_w \subseteq$ L, and forms successful transaction set W$^T$ between the F$_w$ and the L$_w$.

$$P_{ij}^{(f)}$$

represents a fee paid by winning PF pf$_i \in$ F to winning PL pl$_i \in$ L in the path R$_j \in$ R. Similarly, $$P_{kj}^{(l)}$$

represents' a return received by the winning PL Pl$_k \in$ L from the PF pf$_i \in$ F in the path R$_j \in$ R.

Definition 1: Candidate Transaction

If the pf$_i \in$ F and the pl$_k \in$ L exist for the path R$_j \in$ R, bid $$B_i^i$$

of the PF pf$_i$ is not zero and positive, and asking price $$A_k^j$$

of the PL pl$_k$ is not zero and positive, transaction (i,j,k) is defined as a candidate transaction. That is, when the PF pf$_i$ needs to obtain a piloting service in the path R$_j$, and the PL pl$_k$ is willing to execute the piloting task in the path R$_j$, a transaction can be made between them.

Definition 2: Successful Transaction

When winning PL set L$_w \subseteq$ L, winning PF set F$_w \subseteq$ F, and path set R are given, if there is the transaction (i,j,k), the transaction is defined as a successful transaction. The auctioneer allocates the PL pl$_k \in$ L to execute a task of the PF in the R$_j \in$ R. A set of all such successful transactions is expressed as $W^T$, as shown in a following formula: $\{pf_1, pf_2, \ldots, pf_n\}$ represents a PF set in the vehicle platoon.

$$W^T = \{(i, j, k) \mid \{pf_1, pf_2, \ldots, pf_n\} \in F_w,$$

$$pi_k \in L_w, R_j \in R, \{pf_1, pf_2, \ldots, pf_n\} \leftarrow pi_k\}$$

At present, utility of the PF and the PL not only depends on a charged fee and a received reward, but also depends on a valuation of the piloting service obtained by the PF and a cost of executing such a piloting task by the PL. Total utility of PFs is defined as a difference between a total valuation of the piloting service obtained by the $pf_i \in F$ and a total fee charged, as shown in a following formula:

$$U_i^{(f)} = \begin{cases} \sum_{(i,j,k) \in W^T} V_i^j - \sum_{(i,j,k) \in W^T} P_{ij}^{(f)}, & \text{if } pf_i \in F_w \\ 0, & \text{otherwise} \end{cases}$$

Similarly, total utility of PLs $pl_k \in L$ is defined as a difference between a total return received by the PFs and a total cost of piloting tasks of the PLs, as shown in a following formula:

$$U_k^{(i)} = \begin{cases} \sum_{(i,j,k) \in W^T} P_{kj}^{(i)} - \sum_{(i,j,k) \in W^T} C_k^j, & \text{if } pi_k \in L_w \\ 0, & \text{otherwise} \end{cases}$$

Figure 2:
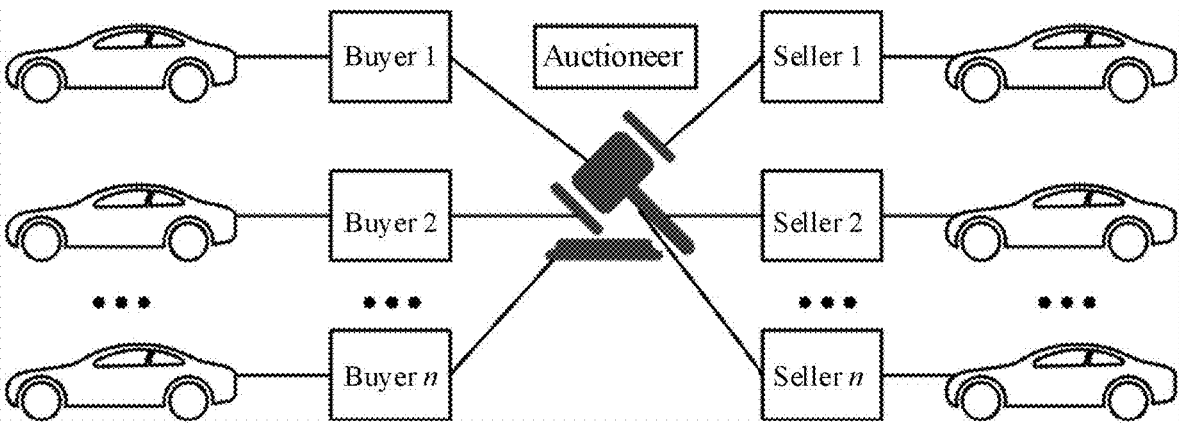
FIG. 2 is a schematic diagram of an auction model according to an embodiment of the present disclosure.

FIG. 2 shows an auction model.

3. Design Objective

A good incentive mechanism should have certain economic characteristics. Therefore, in the present disclosure, a incentive mechanism is redesigned to meet following four expected characteristics:

(1) Individual rationality: The auction mechanism should encourage all participants to provide a bid and an asking price based on a true valuation and cost. This means that for the PF and the PL, an optimal strategy is to make an asking price based on the true valuation and cost, which does not result in a utility loss. The individual rationality ensures that the participant does not seek an unfair benefit through a false competition or demand.

(2) Budget balance: The auction mechanism should ensure that a total return received by the seller does not exceed a total system budget. This can maintain sustainability and an economic balance of an auction.

(3) Incentive compatibility: The incentive mechanism should ensure that the participant has no motive to manipulate authenticity of the bid or the asking price. No matter how the participant adjusts her/his own quotation, the participant should not achieve higher utility. The incentive compatibility ensures that the participant does not manipulate the bid or the asking price to alter an earning of the participant in the auction.

(4) Computational efficiency: The auction mechanism should be designed efficiently to handle large-scale transactions and support a large number of participants within reasonable time. Lower computational complexity can ensure real-time performance and scalability of the mechanism.

Embodiment 2

A incentive mechanism based on a double auction in this embodiment of the present disclosure is used for vehicle platoon matching in a vehicle platoon service. Herein, the present disclosure provides details. A proposed double-auction mechanism is constituted by two main stages: a candidate transaction stage and a successful transaction stage.

Figure 3:
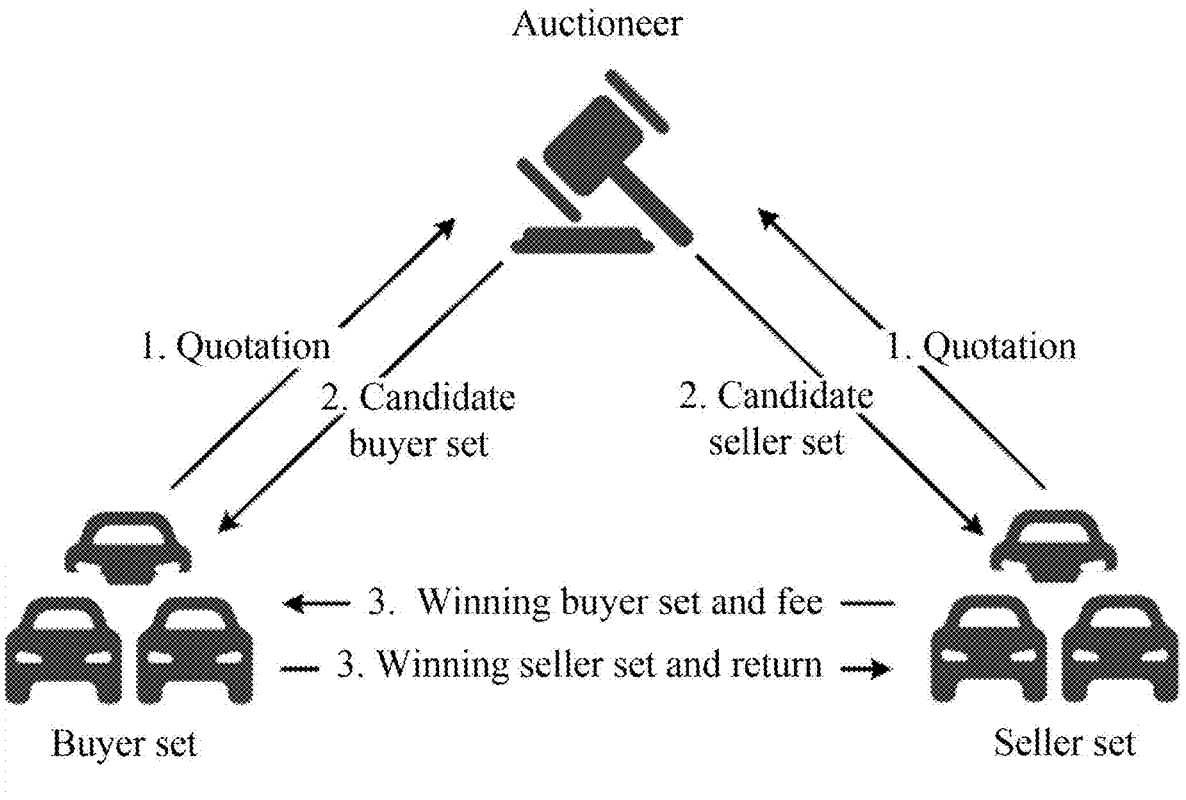
FIG. 3 is a flowchart of a platoon-based auction according to an embodiment of the present disclosure.

In consideration of specific details of a bid and an asking price, the present disclosure aims to establish a incentive mechanism for a vehicle platooning system to achieve fair task allocation (free from market manipulation) and satisfy some ideal attributes. In order to achieve this goal, the present disclosure needs to design a vehicle platoon allocation process, which mainly allocates/maps a PL and a PF. As shown in FIG. 3, a non-zero positive bid and a non-zero positive asking price are obtained by using a bidding matrix (B) and price asking matrix A. Then, a candidate transaction set (T) is determined based on potential transaction (i,j,k). A candidate transaction involves a PF and a PL that meet some auction criteria/conditions (detailed information will be provided later in this section). Only a PL with maximum utility is retained, and a remaining candidate PL is eliminated to perfect the candidate transaction set to obtain a successful transaction set ($W^T$). Finally, the present disclosure determines a fee charged to the PF, and payment/reward/incentive P provided to the PL.

1. Candidate Transaction

The present disclosure collects a bid and an asking price from the PF and the PL, and creates the bidding matrix and the price asking matrix. It should be noted that a path set is a key factor for the PF and the PL, because path selection can affect a decision for making the bid and the asking price. That is, for any task, different bids and asking prices are selected based on different path sets. However, an impact of the path set on bidding and price asking processes is task specific. Specifically, the path set includes different path selections that affect efficiency, time, and a cost of completing a task by a vehicle platoon. Therefore, when considering the path set, the present disclosure needs to consider following factors: (1) Path length: The path length affects the time of completing the task and a cost of a vehicle, such as a fuel consumption. Therefore, the path length is an important consideration. (2) Vehicle platoon size: A change in the vehicle platoon size affects the efficiency of completing the task, thereby further affecting the decision for making the bid and the asking price. Therefore, it is necessary to determine the vehicle platoon size based on an actual situation. (3) Route difficulty: The vehicle platoon needs to consider a difficulty of a route, such as a mountain road and an altitude, because these factors can affect fuel efficiency of the vehicle and the time of completing the task. In addition to the above factors, other factors can also affect the selection of the bid and the asking price, such as weather and road quality.

The candidate transaction set (T) and a winning PF are determined by calling Function(F,L,B,A). PF set F, PL set L, the bidding matrix B, and the price asking matrix A are used as inputs. Firstly, the present disclosure creates new PF set M from original PF set F. For any PF $pf_i \in F$, the set M includes $$pf_i^j$$

only when $$B_i^j > 0.$$

This means that the PF $pf_i \in F$ appears in the M only when bid $R_j \in R$ is a non-zero positive number. Then, PFs in the M are sorted in a non-increasing order based on the non-zero positive bid to construct list $List[M'](1 \leq i \leq n)$, $pf_1 \geq pf_2 \geq \ldots \geq pf_n$.

Similarly, for the PL, the present disclosure creates new PL set N from original PL set L. For any PL $pl_k \in L$, the set N includes $$pl_k^j$$

only when $$A_k^j > 0.$$

Then, the present disclosure sorts PLs in the N in a non-decreasing order based on the non-zero positive asking price to construct list $List[N'](1 \leq k \leq m)$, $pl_1 \leq pl_2 \leq \ldots \leq pl_m$.

Next, the present disclosure determines an asking price threshold, where the asking price threshold is an asking price of a median PL in N' and represented by $A_\lambda$. $\lambda = \lceil (m+1)/2 \rceil$.

The asking price threshold $A_\lambda$ is used to construct set $$M_q'$$

that includes the first q PFs in M', such that $B_q \geq A_\lambda$. For each $$pf_i^j \in M_q',$$

if there is one $$A_k^j$$

that satisfies $$A_k^j < A_\lambda,$$

the present disclosure adds PL $pl_i$ to newly created set $Z_i^j$ including all PLs $$pl_k^{ij} \in N$$

that meet condition $$A_k^j < A_\lambda,$$

The set $$Z_i^j$$

includes all PLs won by the PF $$pf_i^j.$$

In addition, for each combination $$\left( pf_i^j \in M, pl_k^{ij} \in N' \right)$$

that meets the above condition, the present disclosure creates one transaction (i,j,k) and adds the transaction to the candidate transaction set T. At the end of a cycle, each $$Z_i^j$$

is merge into new set Z.

2. Successful Transaction

After the candidate transaction stage, the present disclosure calls Function(Z,T) to confirm the successful transaction. Only one of the PLs won by the PF $$pf_i^j$$

in the $$Z_i^j$$

needs to be retained through elimination. An auctioneer only retains a PL with maximum total utility. In order to achieve this goal, PLs in the $$Z_i^j$$

are first sorted in the non-decreasing order based on asking prices of the PLs. That is, $$\text{List}\left[Z_{ij}^{(s)}\right](1 \le s \le m),\, pl_1 \le pl_2 \le \ldots \le pl_s.$$

When an end of the list is approached, utility of the PL in a real auction decreases. Finally, the auctioneer retains a first PL in sorted list $$Z_{ij}^{(s)},$$

while a remaining candidate P is eliminated. After the candidate PL is eliminated, a remaining transaction in the T is considered as the successful transaction $W^T$.

Based on the successful transaction set $W^T$, the present disclosure assumes that the first q buyers in the M' are final winning buyers, bid $B_q$ of a $q^{th}$ buyer is used as fee $$P_{ij}^{(f)}$$

required to be paid by each winning buyer. In order to meet a budget balance attribute, a total return received by a seller does cannot exceed a total system budget. That is, $$P_{kj}^{(l)} \le qB_q.$$

Based on the $$P_{kj}^{(l)} \le qB_q,$$

the auctioneer calculates the return $$P_{kj}^{(l)}$$

received by the winning seller.

On a premise of ensuring that the bid and the asking price of the PF and the PL are based on a same currency, it can be ensured that a result of an auction process is not affected. For example, when RMB is used as a currency unit, it is assumed that a bid range of the PF is [0-1], and an asking price range of the PL is [10-1000]. In this case, due to a significant difference between the PF and the PL, a consensus cannot be reached. As a result, the auction cannot be performed smoothly.

In this case, the PF and the PL can re-examine respective bidding and price asking strategies, and have an opportunity to participate in a next auction by updating respective bid and asking price. Such an adjustment provides an opportunity for the PF and the PL to reassess a market demand and a competitive situation, and increases a chance of success of the PF and the PL in the auction by formulating a more competitive and reasonable bid and asking price.

The strategy adjustment is to enable the PF and the PL to better adapt to a current market environment and a demand for a specific path. Through continuous strategy adjustment and improvement, the PF and the PL can enhance their competitiveness in the auction and increase an opportunity of obtaining a suitable transaction.

This flexibility and adjustment capability are important factors in the auction process, providing a participant with an opportunity to adapt to a market fluctuation and a demand change, and maximize a benefit of the participant.

3. Theoretical Analysis

In order to verify that the incentive mechanism meets a design objective of a model, the present disclosure will perform demonstration from four aspects: individual rationality, budget balance, incentive compatibility, and computational efficiency. The present disclosure first states four theoretical attributes of an auction-based incentive mechanism. Subsequently, the present disclosure analyzes these attributes in detail.

Lemma 1: The present disclosure satisfies the individual rationality.

Proof: In order to prove that the present disclosure satisfies the individual rationality, the present disclosure performs demonstration from two aspects: a decision-making process and optimality of the participant.

Firstly, participant i is considered. The participant is facing a scenario of making a decision according to the present disclosure. A goal of the participant i is to maximize personal utility function $U_i$ of the participant. The function depends on bid $B_i$ (or asking price $A_k$) and allocation strategy $S_i$ of the participant i. The present disclosure uses $U_i(B_i, S_i)$ to represent personal utility of the participant i under the specific quotation $B_i$ and the allocation result/selection strategy $S_i$.

The individual rationality of the participant i requires the participant to choose a quotation that can maximize the personal utility of the participant during decision making. Therefore, the present disclosure can represent a requirement of the individual rationality of the participant i as follows:

$$B_i^* = \arg\max(U_i(B_i, S_i))$$

In the above formula, $$B_i^*$$

represents an optimal quotation of the participant i, which maximizes the personal utility function $U_i$.

Secondly, the present disclosure proves that the optimal quotation $$B_i^*$$

of the participant i in the present disclosure meets the requirement of the individual rationality.

According to a design principle of the present disclosure, this mechanism considers the quotation of the participant and a quotation of another participant to determine a final allocation result. The quotation of the another participant is $B_{-i}$, which represents a quotation of each participant except the participant i. Since the present disclosure aims to prove that

25 that the present disclosure satisfies the individual rationality, the present disclosure focuses on the optimal quotation of participant i.

In order to maximize the personal utility, the participant i needs to evaluate an impact of the quotation of the participant on the final allocation result. It is assumed that an optimal allocation result is $$S_i^*.$$

The personal utility function of the participant i can be expressed as follows:

$$U_i(B_i^*, S_i^*) = U_i(B_i^*, S_i^*(B_i^*, B_{-i}))$$

In the above formula, $$S_i^*(B_i^*, B_{-i})$$

represent an optimal allocation result obtained when the quotation of the participant i is $$B_i^*$$

and the quotation of the another participant is $B_{-i}$.

Since the present disclosure aims to maximize the personal utility, the participant i can achieve this goal by searching for the optimal quotation $B_i^*$. Therefore, a following formula can be obtained:

$$U_i(B_i^*, S_i^*) \geq U_i(B_i, S_i^*(B_i, B_{-i}))$$

This indicates that the optimal quotation $$B_i^*$$

of the participant i can at least ensure that the personal utility is not less than personal utility achieved based on another quotation.

In summary, it can be concluded that the present disclosure satisfies the individual rationality. That is, in the present disclosure, the participant i can maximize the corresponding personal utility by selecting the optimal quotation $$B_i^*.$$

Therefore, lemma 1 is proven.

Lemma 2: A proposed auction scheme is budget balanced.

Proof: In order to prove that the proposed auction scheme is budget balanced, the present disclosure performs demonstration from two aspects: the total system budget is not exceeded in the present disclosure, and a payment made by the present disclosure to each participant is effective and reasonable.

To verify that the incentive mechanism meets a theoretical attribute of the budget balance, the present disclosure needs to ensure that the total return received by the seller does not exceed the total system budget. An attribute requirement for the budget balance is as follows:

$$P_{kj}^{(l)} \leq qB_q,$$
$$1 \leq k \leq n,$$
$$1 \leq j \leq m$$

Now, the present disclosure demonstrates in detail the attribute of the budget balance.

Firstly, it is considered that the total system budget is not exceeded in the present disclosure. It is assumed that there are n participants participating in the auction and a payment of each participant i is $P_i$. According to the design principle of the present disclosure, the auctioneer selects a quotation that makes an auction result optimal, which is denoted as $$B^*.$$

Therefore, an earning of the auctioneer is calculated according to a following formula:

$$R = \sum B^* - \sum P_i$$

In the above formula, $\sum P_i$ represents a sum of payments to all participants.

Next, the present disclosure proves that the total system budget is not exceeded in the present disclosure.

It is considered that the optimal quotation of the participant i is $$B_i^*,$$

and a payment in this case is $$P_i^*.$$

It is assumed that the optimal quotation of the another participant is $$B_{-i}^*$$

and an optimal payment of the another participant is $P_{-i}^*$. In this case, the earning of the auctioneer can be expressed as follows:

$$R = B_i^* - P_i^* + \sum B_{-i}^* - \sum P_{-i}^*$$

Specifically, the present disclosure assumes that asking price $$A_k^j$$

of each PL and bid $$B_i^j$$

of each PF are determined in a transaction process. In the candidate transaction stage, the present disclosure has obtained the candidate transaction set T, which includes all feasible transaction combinations.

Then, in a successful transaction algorithm, for PLs won by each PF $$pf_i^j$$

in the $$Z_i^j,$$

the present disclosure needs to eliminate an excess PL and only retain the PL with the maximum total utility.

A quantity of PLs in the $$Z_i^j$$

is considered, which is denoted as $$r_i^j.$$

The present disclosure can obtain that $$r_i^j \le n,$$

because there are at most n PLs available for selection. In sorted list $$Z_{ij}^{(s)},$$

an asking price of a $k^{th}$ PL is denoted as $$A_k^{(s)}.$$

According to a nature of the sorting, the present disclosure can obtain a following conclusion:

$$A_1^{(s)} \le A_2^{(s)} \le \dots \le A_{r_i^j}^{(s)} \le \dots \le A_n^{(s)}$$

Next, the present disclosure needs to determine a quantity of PLs retained in the list $$Z_{ij}^{(s)},$$

which is denoted as $$\tilde{r}_i^j.$$

In order to meet the attribute of the budget balance, the total return received by the seller is expected not to exceed the total system budget in the present disclosure, namely:

$$\sum_{j=1}^{m} P_{kj}^{(l)} \le \sum_{j=1}^{m} qB_q,$$

$$1 \le k \le n$$

As described in the success transaction algorithm, the present disclosure only retains the first PL in the list $$Z_{ij}^{(s)},$$

and eliminates the remaining candidate PL. Therefore, $$\tilde{r}_i^j = 1$$

Now, the present disclosure can calculate the return $$P_{kj}^{(l)}$$

received by the winning seller:

$$P_{kj}^{(l)} = \begin{cases} A_k^{(s)}, & \text{if } r_i^j = 1 \text{ and } k = 1 \\ 0, & \text{otherwise} \end{cases}$$

It is noted that when $$\tilde{r}_i^j = 1,$$

that is, when only the first PL is retained, the return $$P_{kj}^{(l)}$$

received by the seller is asking price $$A_k^{(s)}$$

of the first PL.

Finally, in order to ensure the attribute of the budget balance, the present disclosure needs to ensure that a return received by all winning sellers does not exceed a fee that needs to be paid by each winning buyer, namely:

$$A_1^{(s)} \le qB_q$$

Due to the characteristics of the present disclosure, a goal of the auctioneer is to select the optimal quotation to maximize the total utility. Therefore, the present disclosure can assume that an optimal payment of the participant i is effective and reasonable, and the optimal payment of the another participant is also effective and reasonable. This means that an optimal payment of each participant is determined based on a personal utility function of the participant and the optimal quotation of the another participant. Therefore, the present disclosure can obtain a following formula:

$$R = B_i^* - P_i^* + \sum B_{-i}^* - \sum P_{-i}^* = B^* - \sum P_i \ge 0$$

This indicates that the total system budget is not exceeded in the present disclosure. This means that the total return $$P_{kj}^{(l)}$$

received by the seller does not exceed the fee B that needs to be paid by the winning buyer. In this case, the design of the incentive mechanism ensures that the total system budget is not exceeded, and the budget balance is achieved.

In summary, the present disclosure can conclude that the proposed auction scheme is budget balanced. That is, the total system budget is not exceeded.

Therefore, lemma 2 is proven.

Lemma 3: The proposed auction scheme is incentive-compatible for the PF.

Proof: In order to prove that the proposed auction scheme is incentive-compatible for the PF, the present disclosure needs to prove that in the auction, an optimal strategy of the PF is to provide the bid based on a true valuation, and the PF has no motive to manipulate the auction.

The present disclosure assumes that a true valuation vector of the PF $pf_i \in F$ is $V_i$, and a true valuation of the PF on the path $R_j \in R$ is $$V_i^j.$$

The present disclosure also assumes that the PF provides the bid based on the true valuation.

Firstly, the present disclosure proves that in the auction, the optimal strategy of the PF is to provide the bid based on the true valuation.

It is assumed that a highest bid of the PF $pf_i \in F$ on the path $R_j \in R$ is $$B_i^j.$$

For the transaction (i,j,k), the asking price of the PL $$pl_k^j \text{ is } A_k^j.$$

According to a rule of the auction mechanism, the PF needs to pay fee $$P_{ij}^{(f)}$$

in the transaction. After the transaction is successful, the PF $pf_i$ can obtain a piloting service provided by the PL $$pl_k^j.$$

It is assumed that the PF $pf_i$ adopts a false quotation strategy in the transaction, that is, makes a bid lower than the true valuation, namely, $$B_i^{j\prime} < V_i^{j\prime},$$

such that PL $$pl_k^{j\prime}$$

is willing to provide a piloting service on the path $R_j$. In this case, there are two possibilities:

1. If $$B_i^{j\prime} < A_k^{j\prime},$$

the PF $pf_i$ does not win the transaction because an asking price of the PL $$pl_k^{j\prime}$$

is greater than the bid of the PF $pf_i$. Therefore, the PF $pf_i$ does not obtain any piloting service and its utility is 0.

2. If $$B_i^{j'} \geq A_k^{j'},$$

the PF pf$_i$ wins the transaction because its bid is high enough to meet the asking price of the PL $$pl_k^{j'}.$$

However, in this case, an actual fee paid by the PF pf$_i$ to obtain the piloting service is $$P_{ij}^{(f)},$$

and the $$A_k^{j'}$$

needs to be considered. According to the rule of the auction mechanism, the fee that needs to be paid by the PF is a lowest asking price for winning the transaction. However, because $$B_i^{j'} < V_i^{j'},$$

the PF actually pays a high fee for its valuation. Therefore, for the PF pf$_i$, the loss outweighs the gain, and the utility is less than 0.

Now, it is assumed that the PF pf$_i$ adopts a false quotation strategy in the transaction, that is, makes a bid greater than the true valuation, namely, $$B_i^j > V_i^j,$$

such that the PL $$pl_k^j$$

is willing to provide the piloting service on the path R$_j$. In this case, there are two possibilities:

1. If $$B_i^j \geq A_k^j,$$

the PF pf$_i$ wins the transaction because its bid is high enough to meet the asking price of the PL $$pl_k^j.$$

However, in this case, an actual fee paid by the PF pf$_i$ to obtain the piloting service is $$P_{ij}^{(f)},$$

and the $$A_k^j$$

needs to be considered. According to the rule of the auction mechanism, the fee that needs to be paid by the PF is a lowest asking price for winning the transaction. However, because $$B_i^j > V_i^j,$$

the PF actually pays a high fee for its valuation. Therefore, for the PF pf$_i$, the loss outweighs the gain, and the utility is less than 0.

2. If $$B_i^j < A_k^j,$$

the PF pf$_i$ does not win the transaction because the asking price of the PL $$pl_k^j$$

is greater than the bid of the PF pf$_i$. Therefore, the PF pf$_i$ does not obtain any piloting service and its utility is 0.

In summary, in the auction scheme, the optimal strategy of the PF is to provide the bid based on the true valuation, because any false quotation will make the loss outweigh the gain for the PF, and the utility of the PF is less than or equal to 0.

Secondly, the present disclosure needs to prove that the PF has no motive to manipulate the auction during the auction.

It is assumed that the PF pf$_i \in$ F attempts to manipulate the auction to obtain higher utility. This means that the PF will adopt an untrue bidding strategy in an attempt to affect a probability of winning the transaction by the PF or the fee paid by the PF.

The present disclosure has proved that in the auction, the optimal strategy of the PF is to provide the bid based on the true valuation. Therefore, there is no real benefit for the PF to manipulate the auction. If the PF adopts the untrue bidding strategy, the utility is less than or equal to 0, and even a loss is caused. Therefore, the PF has no motive to manipulate the auction.

In summary, the auction scheme is incentive-compatible for the PF, the optimal strategy of the PF is to provide the bid based on the true valuation, and the PF has no motive to manipulate the auction.

Therefore, lemma 3 is proven.

Lemma 4: The proposed auction scheme is incentive-compatible for the PL.

Proof: In order to prove that the proposed auction scheme is incentive-compatible for the PL, the present disclosure needs to prove that in the auction, an optimal strategy of the PL is to provide the asking price based on a true cost, and the PL has no motive to manipulate the auction.

The present disclosure assumes that a true cost vector of the PL $pl_k \in L$ is $C_k$, and a true cost of the PL on the path $R_j \in R$ is $$C_k^j.$$

The present disclosure also assumes that the PL provides the asking price based on the true cost.

Firstly, the present disclosure proves that in the auction, the optimal strategy of the PL is to provide the asking price based on the true cost.

It is assumed that a lowest asking price of the PL $pl_k \in L$ on the path $R_j \in R$ is $$A_k^j.$$

For the transaction (i,j,k), the bid of the PF $$pf_i^j \text{ is } B_i^j.$$

According to the rule of the auction mechanism, the PL will obtain the return $$P_{kj}^{(i)}$$

in the transaction. After the transaction is successful, the PL needs to provide the piloting service.

It is assumed that the PL $pl_k$ adopts a false quotation strategy in the transaction, that is, provides an asking price greater than the true cost, namely, $$A_k^{j'} > C_k^{j'},$$

such that PF $$pf_i^{j'}$$

is willing to pay the asking price. In this case, there are two possibilities:

1. If $$A_k^{j'} > B_i^{j'},$$

the PL $pl_k$ does not win the transaction because a bid of the PF $$pf_i^{j'}$$

is less than the asking price of the PL $pl_k$. Therefore, the PL $pl_k$ does not obtain any return and its utility is 0.

2. If $$A_k^{j'} \le B_i^{j'},$$

the PL $pl_k$ wins the transaction because its asking price does not exceed the bid of the PF $$pf_j^{f'}.$$

However, in this case, an actual cost of providing the piloting service by the PL is $$P_{kj'}^{(i)},$$

and the $$A_k^{j'}$$

needs to be considered. According to the rule of the auction mechanism, the return obtained by the PL is the lowest asking price for winning the transaction. However, because $$A_k^{j'} > C_k^{j'},$$

the PL actually provides the piloting service at a high cost. Therefore, for the PL $pl_k$, the loss outweighs tie gain, and the utility is less than 0.

Now, it is assumed that the PL $pl_k$ adopts a false quotation strategy in the transaction, that is, provides an asking price less than the true cost, namely, $$A_k^{j'} < C_k^{j'},$$

such that the PF $$pf_i^{j'}$$

is willing to pay the asking price. In this case, there are two possibilities:

1. If $$A_k^{j'} > B_i^{j'},$$

the PL $pl_k$ does not win the transaction because the bid of the PF $$pf_i^{j'}$$

is less than the asking price of the PL $pl_k$. Therefore, the PL $pl_k$ does not obtain any return and its utility is 0.

2. If $$A_k^{j'} \le B_i^{j'},$$

the PL $pl_k$ wins the transaction because its asking price does not exceed the bid of the PF $$pf_i^{j'}.$$

However, in this case, an actual cost of providing the piloting service by the PL is $$P_{kj'}^{(l)},$$

and the $$A_k^{j'}$$

needs to be considered. According to the rule of the auction mechanism, the return obtained by the PL is the lowest asking price for winning the transaction. However, because $$A_k^{j'} < C_k^{j'},$$

the PL actually provides the piloting service at a low cost. Therefore, the utility of the PL $pl_k$ is greater than 0.

In summary, in the auction scheme, the optimal strategy of the PL is to provide the asking price based on the true cost, because any false quotation will make the loss outweigh the gain for the PL, and the utility of the PL is less than or equal to 0.

Secondly, the present disclosure needs to prove that the PL has no motive to manipulate the auction during the auction.

It is assumed that the PL $pl_k \in L$ attempts to manipulate the auction to obtain higher utility. This means that the PL will adopt an untrue price asking strategy in an attempt to affect a probability of winning the transaction by the PL or the return obtained by the PL.

The present disclosure has proved that in the auction, the optimal strategy of the PL is to provide the asking price based on the true cost. Therefore, there is no real benefit for the PL to manipulate the auction. If the PL adopts the untrue price asking strategy, the utility is less than or equal to 0, and even a loss is caused. Therefore, the PL has no motive to manipulate the auction.

In summary, the auction scheme is incentive-compatible for the PL, the optimal strategy of the PL is to provide the asking price based on the true cost, and the PL has no motive to manipulate the auction.

Therefore, lemma 4 is proven.

Theorem 1: The proposed auction scheme is incentive-compatible.

Proof: Lemma 3 indicates that the present disclosure is incentive-compatible for the PF. Lemma 4 indicates that the present disclosure is incentive-compatible for the PL. Lemma 3 and Lemma 4 jointly prove that the proposed auction scheme is incentive-compatible and is the optimal strategy for both the buyer and the seller. This provides a solid foundation for successful implementation of the auction, enables the auction to be widely applied in a real transportation environment, and promotes effective resource configuration and smooth completion of the transaction.

Lemma 5: The proposed auction mechanism is computationally effective, with a computational complexity of O(nlogn+mlogm).

Proof: In order to prove computational effectiveness of the auction mechanism, the present disclosure needs to analyze computational complexity of each stage.

1. Candidate transaction stage: In this stage, the auctioneer determines the candidate transaction set T and the new PF set M based on the bidding matrix B and the price asking matrix A. Firstly, time complexity of creating the new PF set M is O(n), where n represents a quantity of PFs. Then, time complexity of sorting the new PF set M in the non-increasing order is O(nlogn). After that, time complexity of creating the new PL set N is O(m), where n represents a quantity of PLs. Time complexity of sorting the new PL set N in the non-decreasing order is O(nlogm). Time complexity of determining the asking price threshold $A_\lambda$ is O(1). Time complexity of constructing the set $$M_q'$$

is O(n), and time complexity of merging each $$Z_i^j$$

into the new set Z is O(nlogn). Therefore, total computational complexity of the candidate transaction stage is O(nlogn+mlogm).

2. Successful transaction stage: In this stage, the auctioneer confirms the successful transaction $W^T$ based on the transaction set T. Firstly, time complexity of sorting each transaction in the transaction set T is O(|T|log|T|), where |T| represents a size of the transaction set T. Then, time complexity of traversing the transaction set T and selecting the successful transaction based on the sorted list $$Z_{ij}^{(s)}$$

is O(|T|) Therefore, total computational complexity of the successful transaction stage is O(|T|log|T|).

In summary, total computational complexity of the auction mechanism is O(nlogn+mnlogm+|T|log|T|). In an actual situation, usually, n>>m, and |T| is far less than n and m. Therefore, an impact of the |T| can be ignored. Therefore, the computational complexity of the proposed auction mechanism is O(nlogn+mlogm). This complexity is efficient in an actual application, and is capable of processing large-scale traffic data and obtaining an auction result within reasonable time. This makes the auction mechanism have good usability and scalability in an actual transportation environment.

Therefore, the present disclosure can conclude that the proposed auction mechanism is computationally effective.

Through the analysis and discussion of these attributes, the present disclosure fully meets expected economic characteristics of the incentive mechanism. The present disclosure not only efficiently processes the transaction and ensures individual rational decision-making and the budget balance, but also encourages the participant to participate in the auction process truthfully and trustily.

Figure 4:
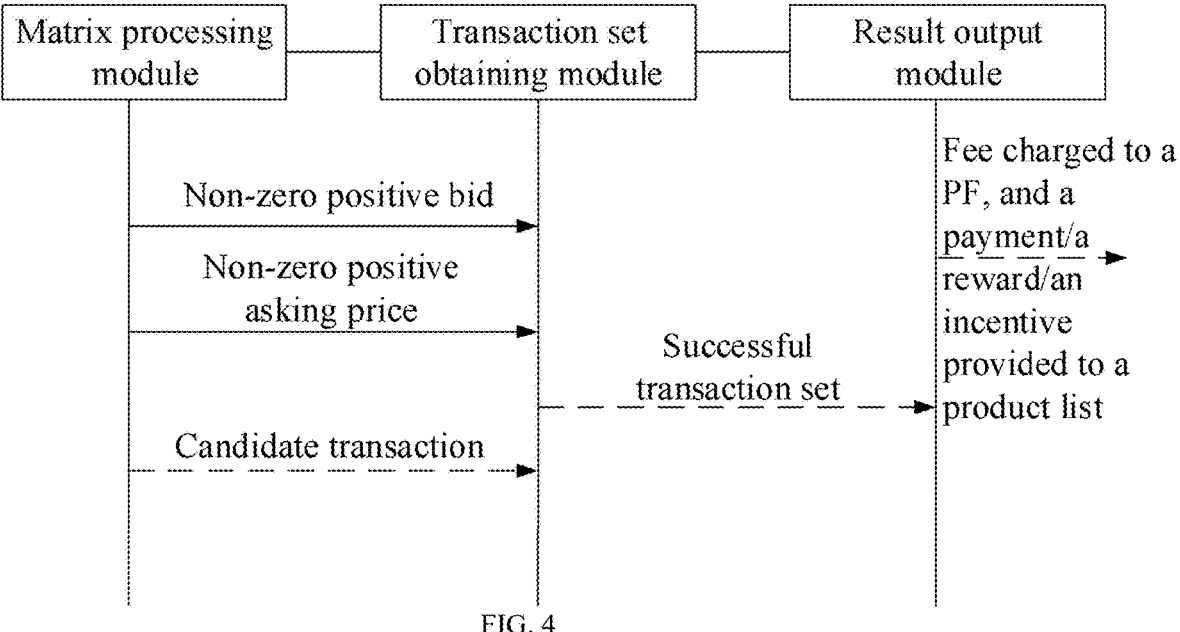
FIG. 4 is a schematic diagram of a vehicle platoon incentive system based on a double auction according to an embodiment of the present disclosure.

As shown in FIG. 4, a vehicle platoon incentive system based on a double auction according to an embodiment of the present disclosure includes:

a matrix processing module configured to obtain a non-zero positive bid and a non-zero positive asking price by using a bidding matrix and a price asking matrix;

a transaction set obtaining module configured to determine a candidate transaction set based on a potential transaction, where a candidate transaction involves a PF and a PL that meet some auction criteria/conditions; and retain only a PL with maximum utility, and eliminate a remaining candidate PL to perfect the candidate transaction set to obtain a successful transaction set; and a result output module configured to determine a fee charged to the PF, and a payment/a reward/an incentive provided to a product list.

Embodiment 3

In an urban road network system, a plurality of vehicles need to travel from point A to point B. These vehicles send their locations, destinations, maximum acceptable fees, and other information to a central controller through their on-board devices.

Based on the received information, the controller determines at least one platooning scheme through calculation. Each platoon consists of one PL and a plurality of PFs to maximize an overall benefit (for example, reduce a fuel consumption and time).

The controller enables the PL and the PF to provide a bid and an asking price based on a double auction. Only a transaction that meets some auction conditions is included in a candidate transaction set.

Finally, the controller determines, as a successful transaction, a platoon formed by a PL with maximum utility and a PF corresponding to the PL, and a remaining candidate PL and PF are eliminated.

The controller determines allocation of a payment/a reward/an incentive for each successful transaction and notifies the relevant vehicles of an allocation result to motivate them to travel according to the determined platoon.

Embodiment 4

In a logistics transportation system, a plurality of trucks depart from a warehouse and transport goods to a plurality of destinations. These trucks send their locations, destinations, load capacities, and other information to a central controller through their on-board devices.

Based on the received information, the controller determines at least one platooning scheme through calculation. Each platoon consists of one PL and a plurality of PFs to maximize an overall benefit (for example, reduce a fuel consumption and time).

The controller enables the PL and the PF to provide a bid and an asking price based on a double auction. Only a transaction that meets some auction conditions is included in a candidate transaction set.

Finally, the controller determines, as a successful transaction, a platoon formed by a PL with maximum utility and a PF corresponding to the PL, and a remaining candidate PL and PF are eliminated.

The controller determines allocation of a payment/a reward/an incentive for each successful transaction and notifies the relevant trucks of an allocation result to motivate them to travel according to the determined platoon.

These embodiments demonstrate potential applications of the technical solutions of the present disclosure in different fields, thereby proving creativity and technical value of the technical solutions of the present disclosure. Through benefit redistribution and task allocation, the technical solutions of the present disclosure help to optimize resource utilization, improve efficiency, and have positive social and economic impacts on a plurality of fields.

The embodiments of the present disclosure have achieved some positive effects in the process of research and development or use, and indeed have great advantages as compared with the prior art. The following content is described in conjunction with data, graphs, and the like of a test process.

1. Experimental Analysis

1.1 Experimental Environment and Setting

In an experiment, 500 PFs are considered, and their bids are normalized within an interval $$B_i^j \in (0, 1].$$

There is no existing statistical data on an asking price of a PL, and an asking price randomly generated for the PL in the present disclosure is uniformly distributed in $$A_k^j \in (0, 1].$$

Herein, asking prices of at most 100 PLs are generated. All asking prices and bids are generated by considering a total of 60 path sets R. Software and hardware environments of a proposed incentive mechanism are as follows:

Experimental hardware environment: (1) CPU: Intel Core i7-8750HCP; (2) memory: DDR4-2666 Hz 8 GB RAM Experimental software environment: (1) operating system: Windows 11 64-bit operating system; (2) system kernel: Windows 11 Professional Edition 21H2; and (3) running environment: Python 3.7.0

In terms of some performance indicators, the present disclosure conducts an experiment to compare the present disclosure with two existing incentive mechanism solutions.

A metric, satisfaction of the PFs, satisfaction of the PLs, total utility of the PFs, and total utility of the PLs are defined to evaluate results of the incentive mechanisms.

Satisfaction of the PFs=Total quantity of successful transactions of the PFs/Total quantity of the PFs Satisfaction of the PLs=Total quantity of successful transactions of the PLs/Total quantity of the PLs Total utility of the PFs=$\Sigma$ utility of the PFs Total utility of the PLs=$\Sigma$ utility of the PLs

1.2. Experimental Result and Analysis (1) Satisfaction of the PFs

Performance of the present disclosure is evaluated and compared with performance of the other two incentive mechanism solutions, including the satisfaction of the PFs, the satisfaction of the PLs, the total utility of the PFs, and the total utility of the PLs. In order to conduct the experiment, the total quantity of the PFs involved ranges from 50 to 500, and the total quantity of the PLs involved ranges from 10 to 100. Then performance of an algorithm is evaluated. It is noted that in this experiment, bids of the PFs are standardized within the interval $$B_i^j \in (0, 1],$$

asking prices of the PLs are standardized within the interval $$A_k^j \in (0, 1],$$

and path set R=60 is set.

Figure 5:
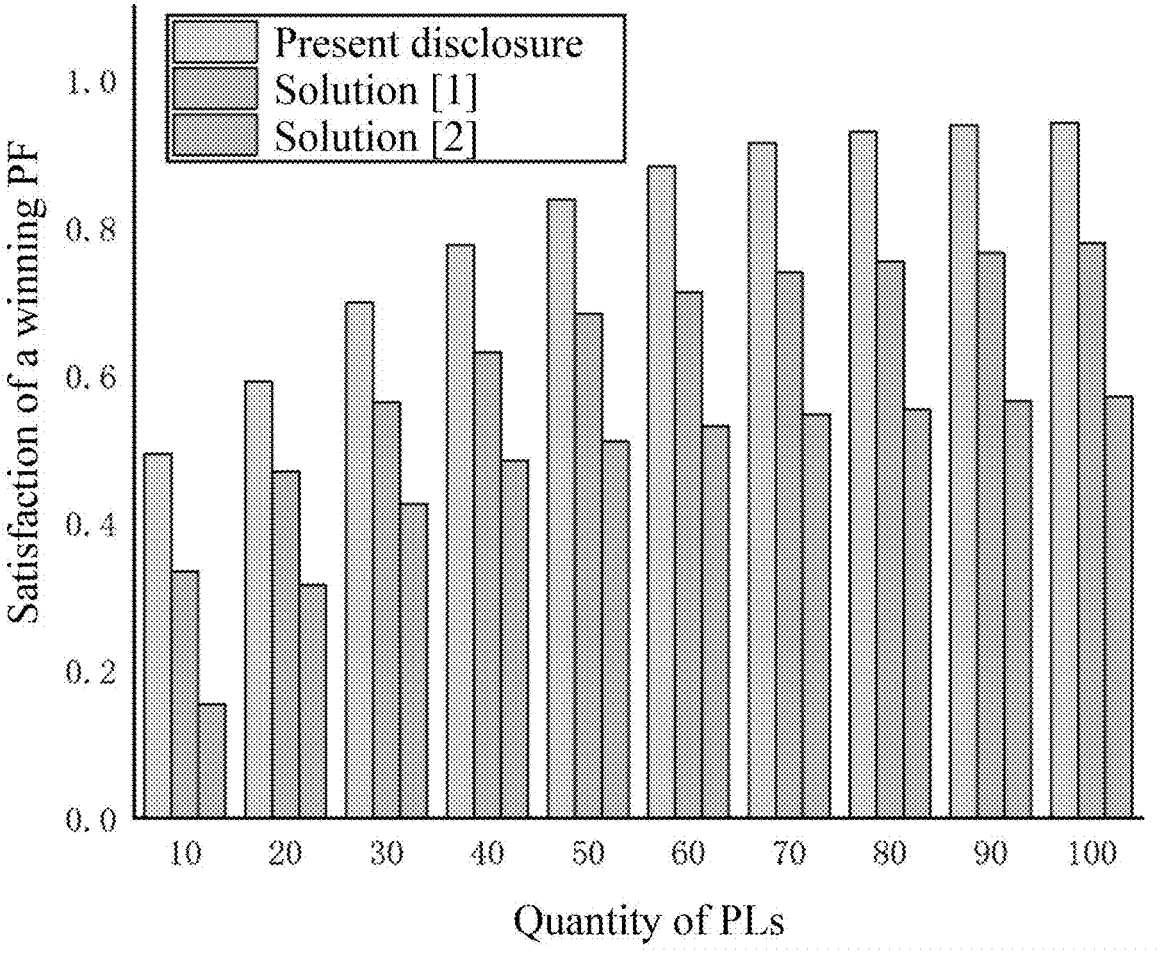
FIG. 5 is a schematic diagram showing satisfaction of a PF when a quantity of PLs increases according to an embodiment of the present disclosure.
Figure 6:
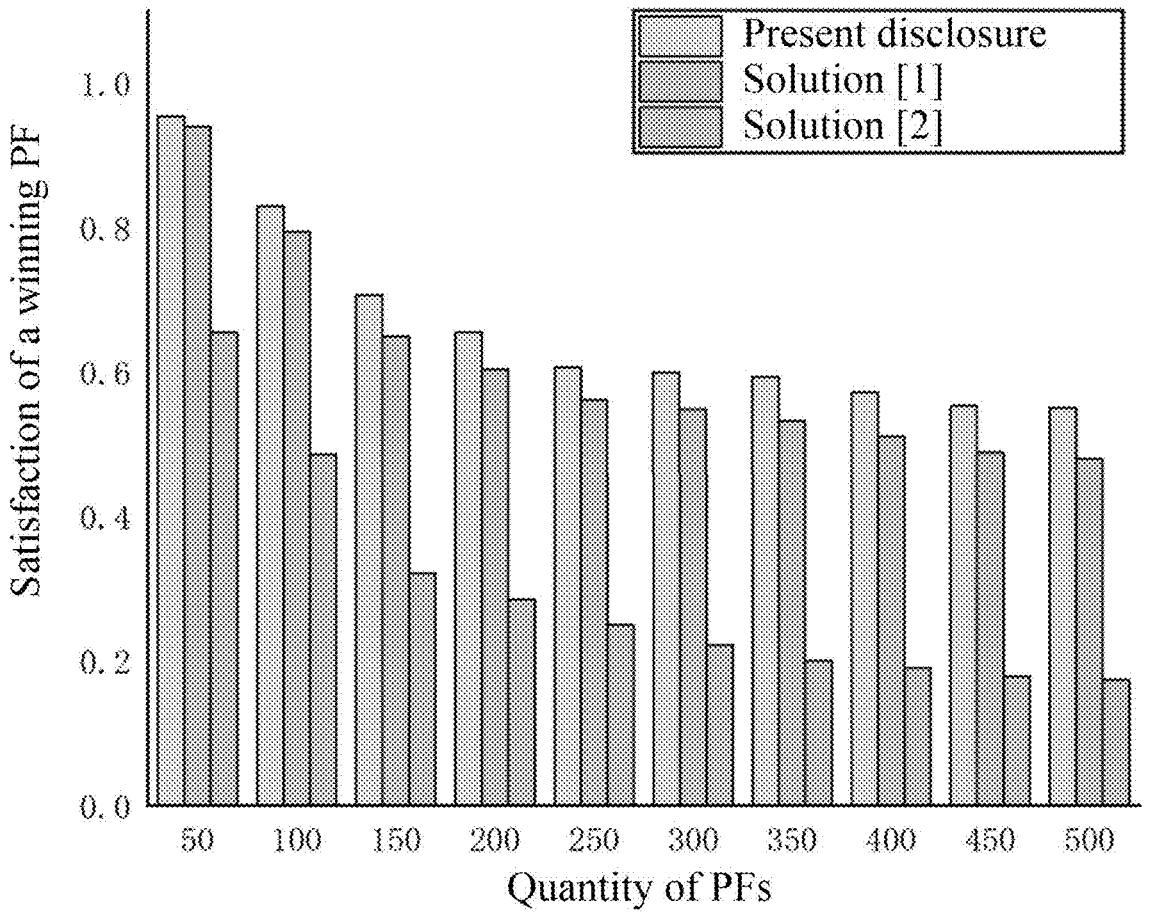
FIG. 6 is a schematic diagram showing satisfaction of a PF when a quantity of PFs increases according to an embodiment of the present disclosure.

FIG. 5 and FIG. 6 show three incentive mechanisms under different settings: normalized incentive mechanisms of the present disclosure and the other two solutions. For all the mechanisms, normalized satisfaction of the PFs increases with an increase in the quantity of the PLs. The present disclosure achieves high satisfaction of the PFs because a quantity of successful bids for the PFs increases as the quantity of the PLs increases (that is, $|W^T|$ increases). However, as the quantity of the PFs increases, the normalized satisfaction of the PFs decreases. This is because the quantity of the PFs (namely, $|F_w|$) also increases as the quantity of the PFs increases. However, $|L_w|$ keeps unchanged. This limits the total quantity of successful transactions $|W^T|$.

(2) Satisfaction of the PLs

Figure 7:
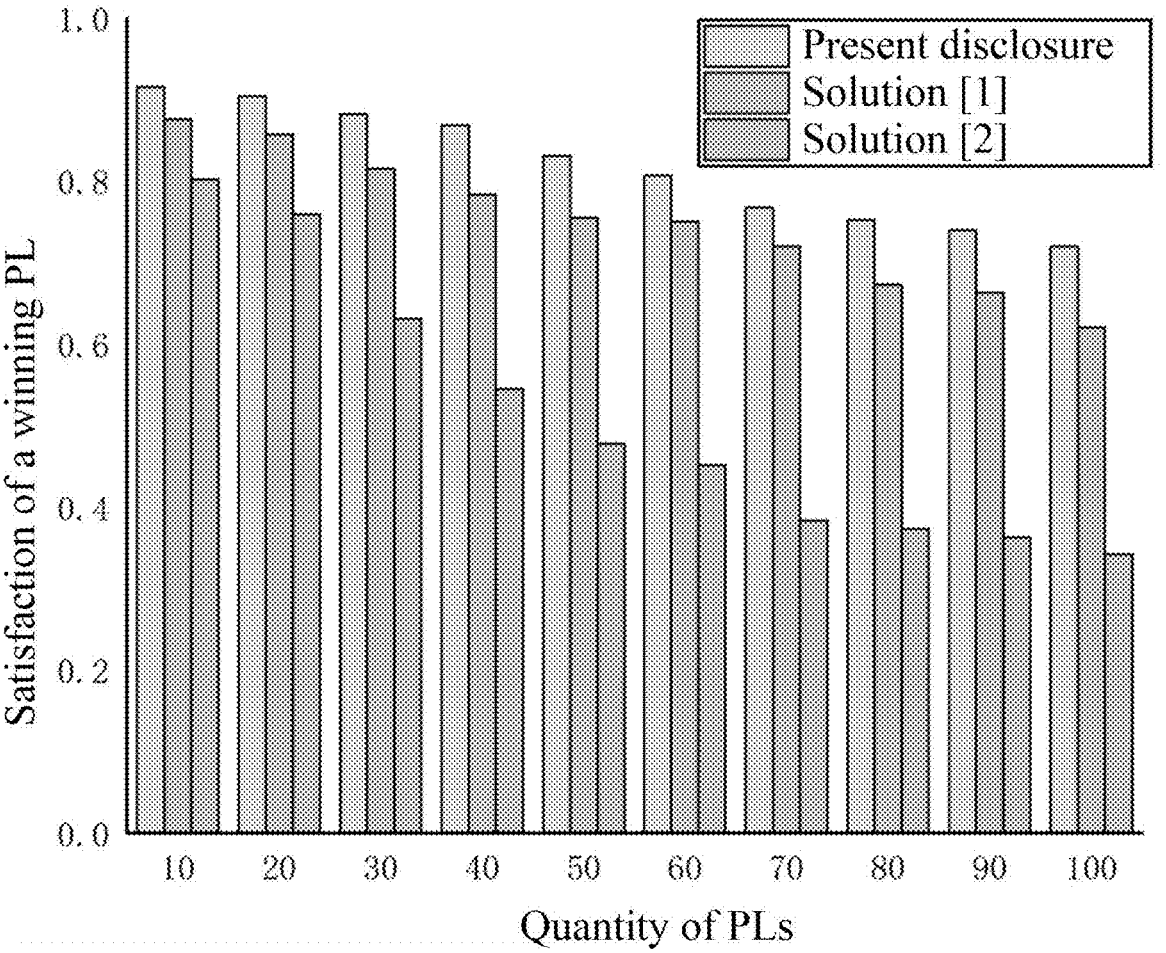
FIG. 7 is a schematic diagram showing satisfaction of a PL when a quantity of PLs increases according to an embodiment of the present disclosure.
Figure 8:
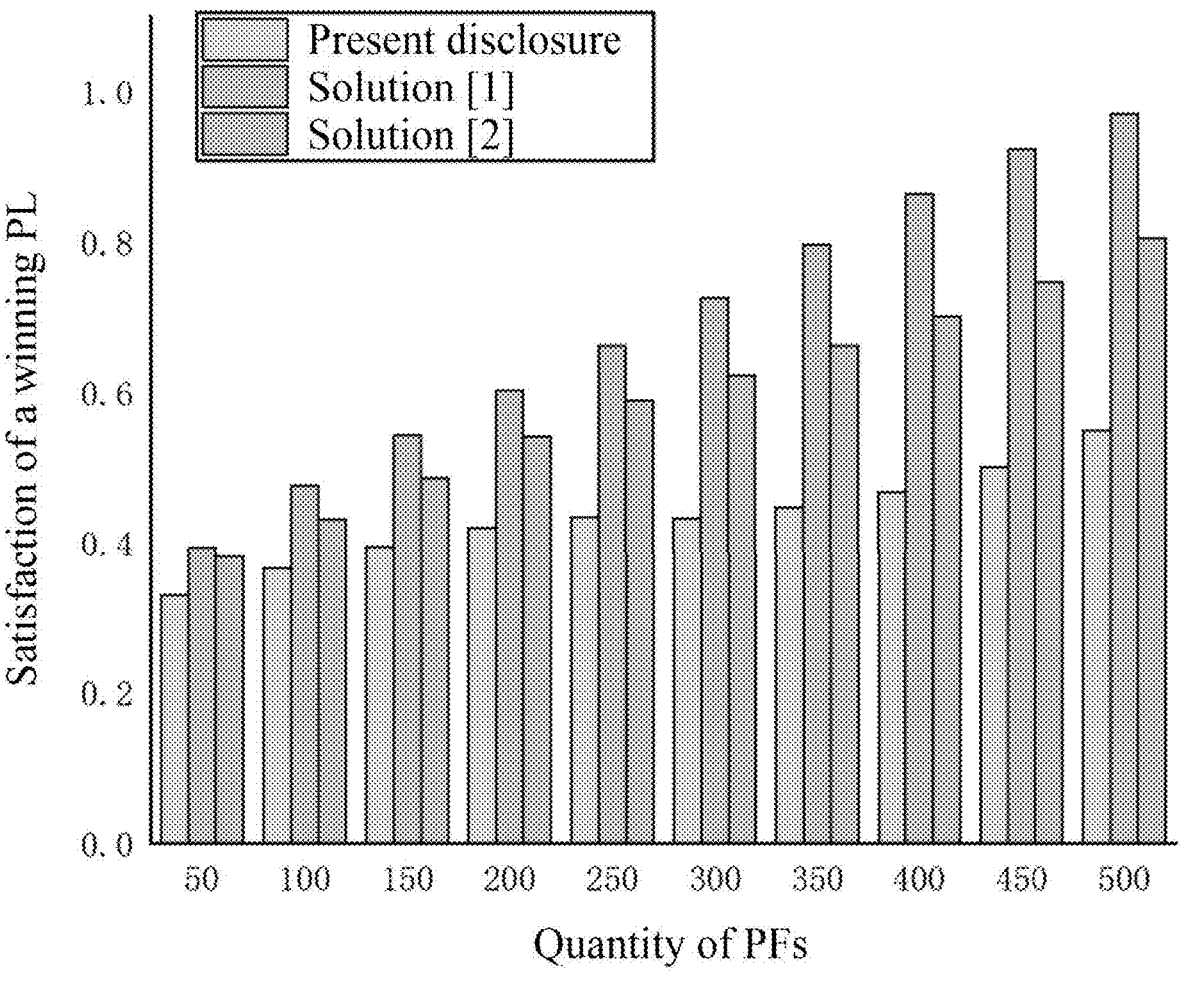
FIG. 8 is a schematic diagram showing satisfaction of a PL when a quantity of PFs increases according to an embodiment of the present disclosure.

FIG. 7 and FIG. 8 show normalized satisfaction of the PLs for the present disclosure and the other two incentive mechanism solutions. As the quantity of the PLs increases, the normalized satisfaction of the PLs decreases. This is because the quantity of the PLs (namely, $|L_w|$) also increases as the quantity of the PLs increases. However, the $|F_w|$ does not change greatly. This limits the total quantity of successful transactions $|W^T|$. In addition, the normalized satisfaction of the PLs increases with an increase in the quantity of the PFs. Herein, as the quantity of the PFs increases, both the $|F_w|$ and the $|W^T|$ increase. This helps the present disclosure achieve high satisfaction of the PLs when the quantity of the PFs increases. Obviously, in terms of the normalized satisfaction of the PLs, the present disclosure is superior to the other two solutions.

(3) Total Utility of the PLs

Figure 9:
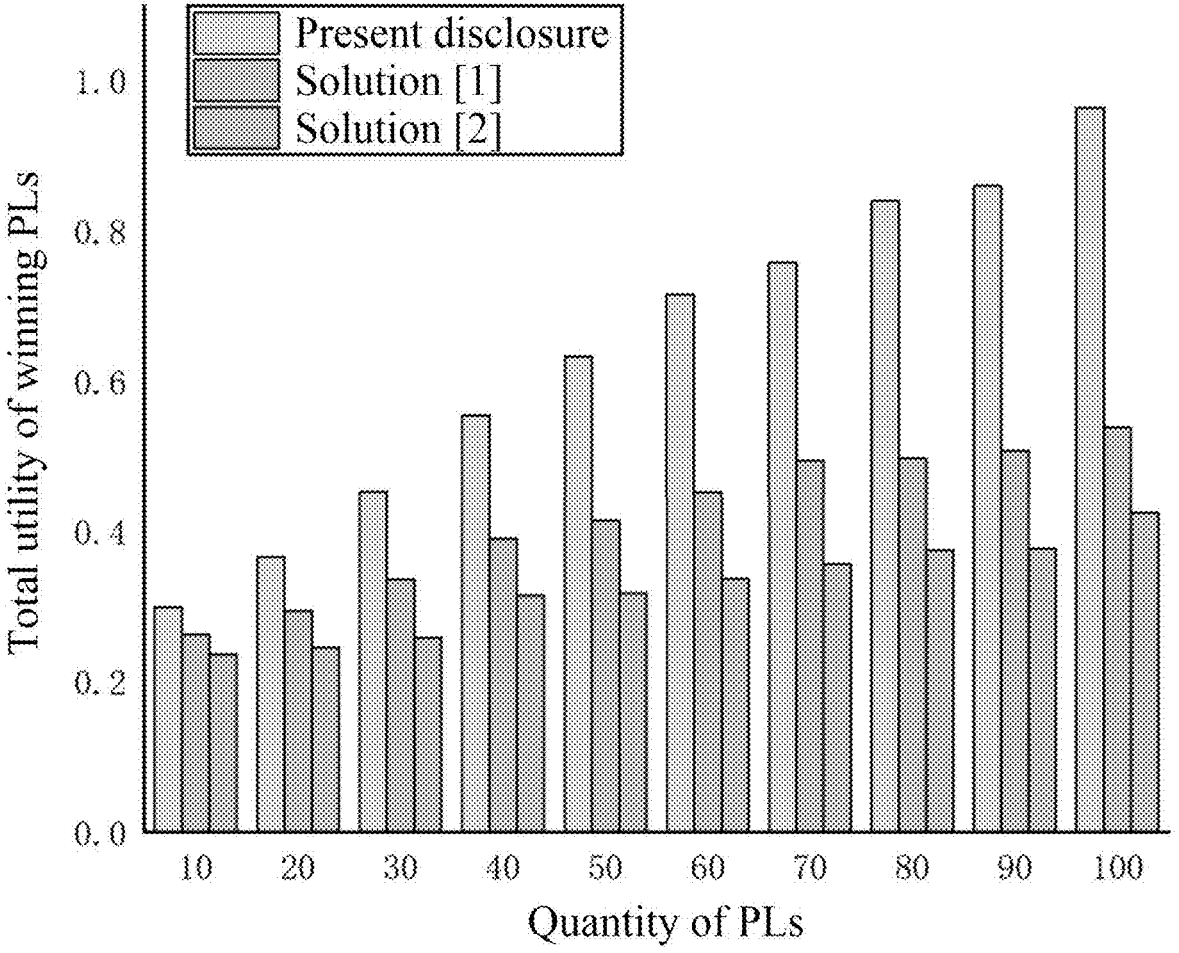
FIG. 9 is a schematic diagram showing total utility of PLs when a quantity of the PLs increases according to an embodiment of the present disclosure.
Figure 10:
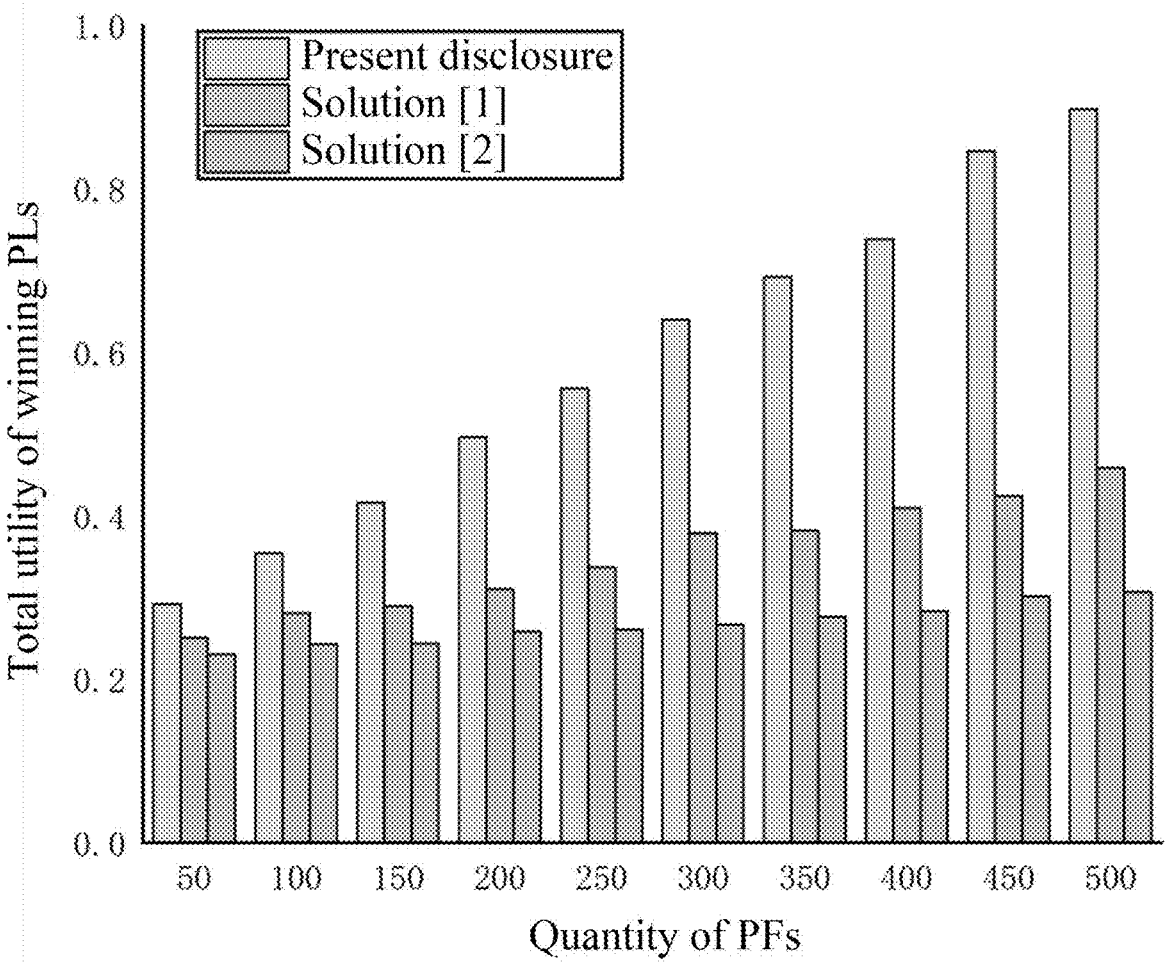
FIG. 10 is a schematic diagram showing total utility of PLs when a quantity of PFs increases according to an embodiment of the present disclosure.

FIG. 9 and FIG. 10 show normalized total utility of the PLs for the present disclosure and the other two incentive mechanism solutions under different settings. It can be seen that the total utility of the PLs of the present disclosure increases sharply. A reason is as follows. The quantity of the PLs varies from 10 to 100, while the quantity of the PFs is fixedly 500. In this case, as the quantity of the PLs increases, unassigned asking price $$A_k^j < A_\lambda$$

will be allocated. Ultimately, in this case, the total utility of the PFs also increases. Similarly, the quantity of the PFs varies from 50 to 500, while the quantity of the PLs is fixedly 100. In this case, as the quantity of the PFs increases, more new lower asking prices win in the auction. Ultimately, the total utility of the PLs increases.

(4) Total Utility of the PFs

Figure 11:
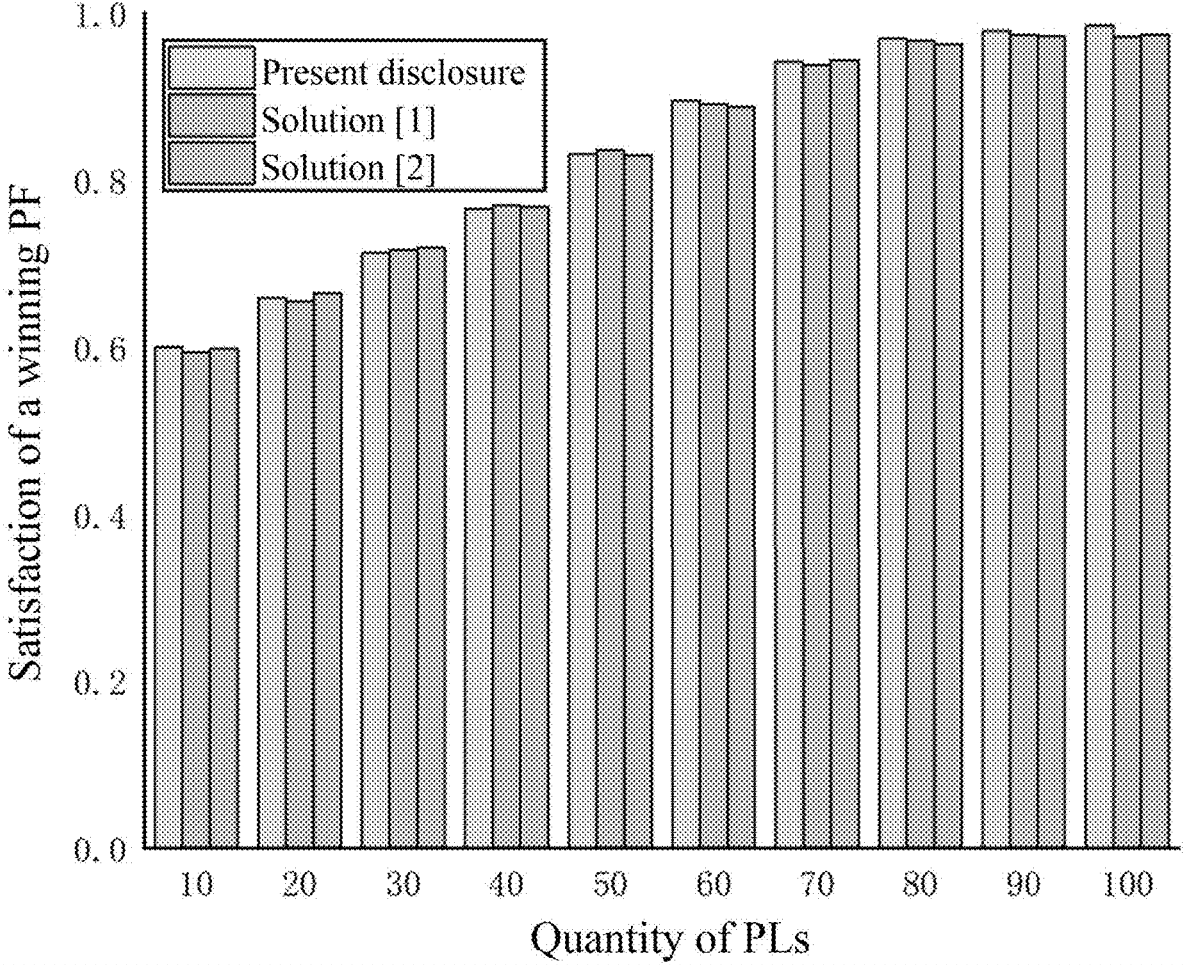
FIG. 11 is a schematic diagram showing total utility of PFs when a quantity of PLs increases according to an embodiment of the present disclosure.
Figure 12:
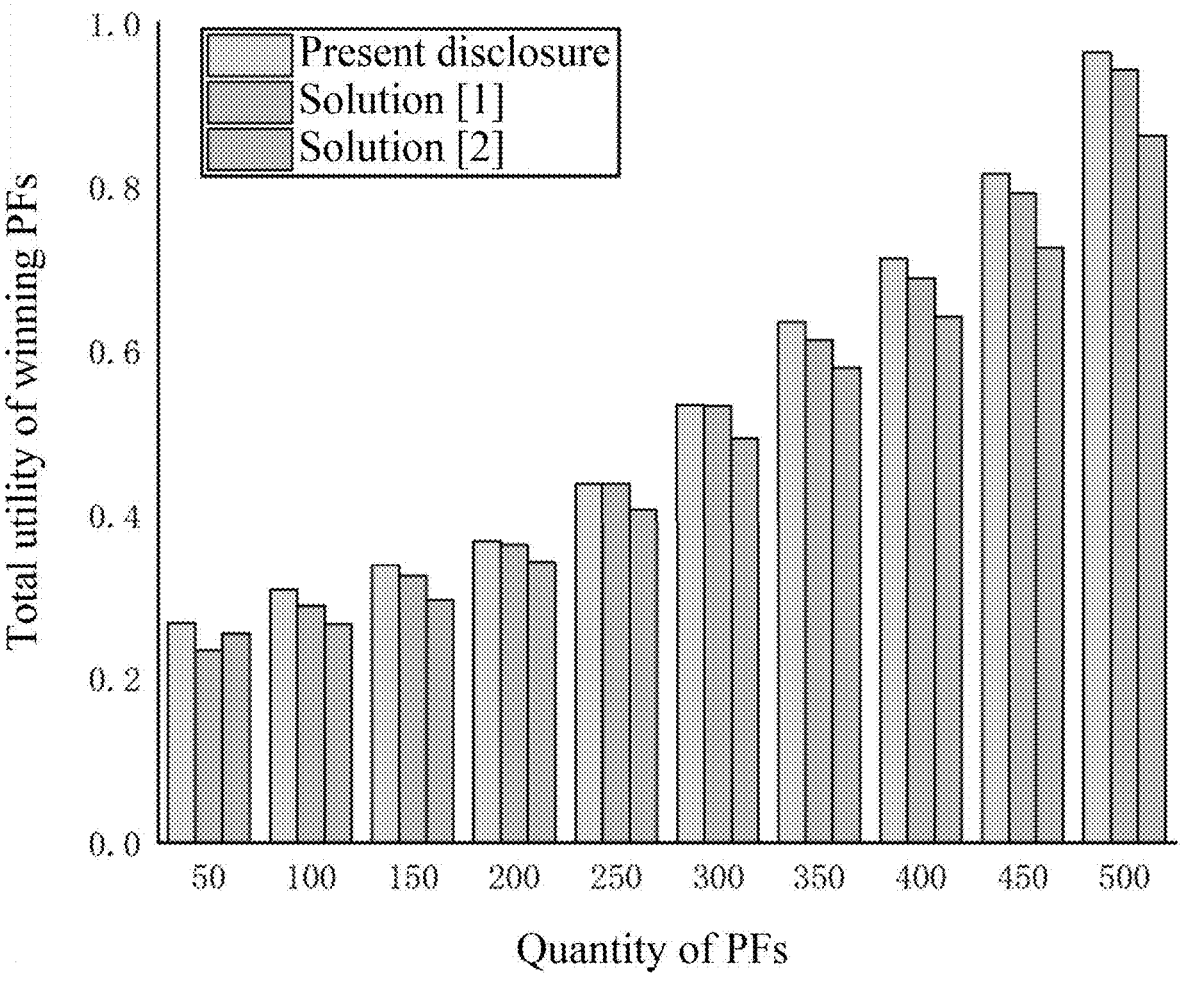
FIG. 12 is a schematic diagram showing total utility of PFs when a quantity of the PFs increases according to an embodiment of the present disclosure.

Similarly, in FIG. 11 and FIG. 12, normalized total utility of the PFs increases in these two cases. As the quantity of the PLs or the PFs increases, the quantity of successful transactions also increases. Ultimately, the total utility of the PFs increases. In these two cases, there is no mechanism that is significantly superior to other mechanisms in terms of the total utility of the PFs.

The vehicle platoon incentive mechanism based on a double auction provided in the present disclosure aims to achieve fair task allocation and meet some ideal attributes. Firstly, in a candidate transaction stage, a candidate transaction set is determined by considering a path set, a bid, and an asking price, and an unqualified PL is eliminated to ultimately obtain a successful transaction set. Then, in a successful transaction stage, an auctioneer retains a PL with maximum utility while meeting a budget balance attribute. If a consensus cannot be reached in an auction, a PF and the PL can adjust their bidding and price asking strategies and participate in the auction again. This flexibility and adjustment capability enable the PF and the PL to adapt to a market fluctuation and a demand change, thereby maximizing benefits of the PF and the PL. Finally, in theoretical analysis of the present disclosure, economic characteristics of the incentive mechanism are verified, including individual rationality, budget balance, incentive compatibility, and computational efficiency. In addition, in experimental analysis, a simulation experiment is conducted to verify effectiveness of the proposed algorithm, and an experimental result and analysis are provided.

The foregoing are merely the specific implementations of the present disclosure, and the protection scope of the present disclosure is not limited thereto. Any modification, equivalent replacement, improvement, etc. made within the technical scope of the present disclosure by those skilled in the art according to the spirit and principle of the present disclosure shall fall within the protection scope of the present disclosure.

What is claimed is:

1. A vehicle platoon incentive method based on a double auction, comprising: transmitting vehicle platoon information to a controller; searching for, by the controller, an optimal vehicle platoon to maximize a benefit of the vehicle platoon and redistribute the benefit among members in the vehicle platoon through an incentive mechanism to motivate a driver or a vehicle owner to form and maintain the optimal vehicle platoon; and implementing the vehicle platoon in a highway system, and using the controller to maximize the benefit of the vehicle platoon and redistribute the benefit to motivate the driver or the vehicle owner to form and maintain the optimal vehicle platoon, so as to promote formation of a stable and efficient vehicle platoon, wherein the method further comprises:

obtaining a non-zero positive bid and a non-zero positive asking price by using a bidding matrix and a price asking matrix;

determining a candidate transaction set based on a potential transaction, wherein a candidate transaction involves a platoon follower (PF) and a platoon leader (PL) that meet some auction criteria/conditions; and retaining only a PL with maximum utility, and eliminating a remaining candidate PL to perfect the candidate transaction set to obtain a successful transaction set; and determining a fee charged to the PF, and a payment/a reward/an incentive provided to a product list, wherein the method further comprises a vehicle platoon allocation process of allocating/mapping the PL and the PF, wherein the vehicle platoon allocation process comprises: first obtaining the non-zero positive bid and the non-zero positive asking price by using the bidding matrix B and the price asking matrix A; then determining the candidate transaction set (T) based on the potential transaction (i,j,k), wherein the candidate transaction involves the PF and the PL that meet the some auction criteria/conditions; and retaining only the PL with the maximum utility, and eliminating the remaining candidate PL to further perfect the candidate transaction set to obtain the successful transaction set ($W^T$); and finally determining the fee charged to the PF, and the payment/reward/incentive P provided to the PL.

2. The vehicle platoon incentive method based on the double auction according to claim 1, further comprising: collecting, by the candidate transaction, a bid and an asking price from the PF and the PL, and creating the bidding matrix and the price asking matrix, wherein for selection of the PF and the PL, a path set affects decisions of the bid and the asking price, and for any task, different bids and asking prices are selected based on different path sets; and an impact of the path set on bidding and price asking processes is task specific.

3. The vehicle platoon incentive method based on the double auction according to claim 2, further comprising: determining the candidate transaction set (T) and a winning PF by calling Function(F, L, B, A), with a PF set F a PL set L, the bidding matrix B, and the price asking matrix A as inputs, comprising: firstly creating a new PF set M from the original PF set F, wherein for any PF $$pf_i \in F,$$

the set M comprises $$pf_i^j$$

only when $$B_i^j > 0,$$

which means that the PF $pf_i \in F$ appears in the M only when a bid $R_j \in R$ is a non-zero positive number; and then sorting PFs in the M in a non-increasing order based on the non-zero positive bid to construct a list List[M']($1 \le i \le n$), $pf_1 \ge pf_2 \ge \ldots \ge pf_n$;

similarly, for the PL, creating a new PL set N from the original PL set L, wherein for any PL $pl_k \in L$, the set N comprises $$pl_k^j$$

only when $$A_k^j > 0;$$

and sorting PLs in the N in a non-decreasing order based on the non-zero positive asking price to construct a list List[N']($1 \le k \le m$), $pl_1 \le pl_2 \le \ldots \le pl_m$; and determining an asking price threshold, wherein the asking price threshold is an asking price of a median PL in N' and represented by $A_\lambda$, wherein $\lambda = \lceil (m+1)/2 \rceil$;

wherein the asking price threshold $A_\lambda$ is used to construct a set $M_q'$ that comprises the first q PFs in M', such that $B_q \ge A_\lambda$; for each $$pf_i^j \in M_q',$$

if there is one $$A_k^j$$

that satisfies $$A_k^j < A_\lambda,$$

a PL $pl_i$ is added to a newly created set $$Z_i^j$$

comprising all PLs $$pl_k^j \in N$$

that meet a condition $$A_k^j < A_\lambda,$$

and the set $$Z_i^j$$

comprises all PLs won by the PF $$pf_i^j;$$

and for each combination $$(pf_i^j \in M_q', pl_k^j \in N')$$

that meets the above condition, one transaction (i,j,k) is created and added to the candidate transaction set T, and at the end of a cycle, each $$Z_i^j$$

is merged into a new set Z.

4. The vehicle platoon incentive method based on the double auction according to claim 1, wherein for a successful transaction according to the vehicle platoon incentive method based on the double auction, after a candidate transaction stage, Function(Z, T) is called to confirm the successful transaction, only one of PLs won by a PF $$pf_i^j$$

in $$Z_i^j$$

is retained through elimination, and an auctioneer only retains a PL with maximum total utility, wherein PLs in the $$Z_i^j$$

are first sorted in a non-decreasing order based on asking prices of the PLs, that is, $$\text{List}\big[Z_{ij}^{(s)}\big](1 \leqslant s \leqslant m),\ pl_1 \leqslant pl_2 \leqslant \dots \leqslant pl_s,$$

and when an end of the list is approached, utility of the PL in a real auction decreases; finally, the auctioneer retains a first PL in a sorted list $$Z_{ij}^{(s)},$$

while a remaining candidate PL is eliminated; and after the candidate PL is eliminated, a remaining transaction in the T is considered as the successful transaction $W^T$; and based on the successful transaction set $W^T$, it is assumed that the first q buyers in M' are final winning buyers, a bid $B_q$ of a $q^{th}$ buyer is used as a fee $$P_{ij}^{(f)}$$

required to be paid by each winning buyer, and a total return received by a seller cannot exceed a total system budget, that is, $$P_{kj}^{(l)} \leqslant qB_q,$$

and the auctioneer calculates, according to $$P_{kj}^{(l)} \leqslant qB_q,$$

the return, $$P_{kj}^{(l)}$$

received by the winning seller.

5. A computer device, comprising a memory and a processor, wherein the memory stores a computer program, and when the computer program is executed by the processor, the processor executes the vehicle platoon incentive method based on the double auction according to claim 1.

6. A non-transitory computer-readable storage medium, wherein the computer-readable storage medium stores a computer program, and when the computer program is executed by a processor, the processor executes the vehicle platoon incentive method based on the double auction according to claim 1.

7. An information data processing terminal, wherein the information data processing terminal is configured to implement the vehicle platoon incentive method based on the double auction according to claim 1.

8. The computer device according to claim 5, wherein the vehicle platoon incentive method based on the double auction further comprises: collecting, by the candidate transaction, a bid and an asking price from the PF and the PL, and creating the bidding matrix and the price asking matrix, wherein for selection of the PF and the PL, a path set affects decisions of the bid and the asking price, and for any task, different bids and asking prices are selected based on different path sets; and an impact of the path set on bidding and price asking processes is task specific.

9. The computer device according to claim 8, wherein the vehicle platoon incentive method based on the double auction further comprises: determining the candidate transaction set (T) and a winning PF by calling Function(F, L, B, A), with a PF set F, a PL set L, the bidding matrix B, and the price asking matrix A as inputs, comprising: firstly creating a new PF set M from the original PF set F, wherein for any PF $pf_i \in$ F, the set M comprises $$pf_i^j$$

only when $$B_i^j > 0,$$

which means that the PF $pf_i \in$ F appears in the M only when a bid $R_j \in$ R is a non-zero positive number; and then sorting PFs in the M in a non-increasing order based on the non-zero positive bid to construct a list List[M'](1≤i≤n), $pf_1 \geq pf_2 \geq \ldots \geq pf_n$;

similarly, for the PL, creating a new PL set N from the original PL set L, wherein for any PL $pl_k \in$ L, the set N comprises $$pl_k^j$$

only when $$A_k^j > 0;$$

and sorting PLs in the N in a non-decreasing order based on the non-zero positive asking price to construct a list List[M'](1≤i≤n), $pf_1 \geq pf_2 \geq \ldots \geq pf_n$; and determining an asking price threshold, wherein the asking price threshold is an asking price of a median PL in N' and represented by $A_\lambda$, wherein $\lambda = \lceil (m+1)/2 \rceil$;

wherein the asking price threshold $A_\lambda$ is used to construct a set $$M_q'$$

that comprises the first q PFs in M', such that $B_q \geq A_\lambda$; for each $$pf_i^j \in M_q',$$

if there is one $$A_k^j$$

46 that satisfies $$A_k^j < A_\lambda,$$

a PL $pl_i$ is added to a newly created set $$Z_i^j$$

comprising all PLs $$pl_k^{ij} \in N$$

that meet a condition $$A_k^j < A_\lambda,$$

and the set $$Z_i^j$$

comprises all PLs won by the PF $$pf_i^j;$$

and for each combination $$\left( pf_i^j \in M_q', \ pl_k^{ij} \in N' \right)$$

that meets the above condition, one transaction (i,j,k) is created and added to the candidate transaction set T, and at the end of a cycle, each $$Z_i^j$$

is merged into a new set Z.

10. The computer device according to claim 5, wherein for a successful transaction according to the vehicle platoon incentive method based on the double auction, after a candidate transaction stage, Function(Z,T) is called to confirm the successful transaction, only one of PLs won by a PF $$pf_i^j \ in \ Z_i^j$$

is retained through elimination, and an auctioneer only retains a PL with maximum total utility, wherein PLs in the $$Z_i^j$$

47 are first sorted in a non-decreasing order based on asking prices of the PLs, that is, $$\mathrm{List}\big[Z_{ij}^{(s)}\big](1 \le s \le m),\ pl_1 \le pl_2 \le \ldots \le pl_s,$$

and when an end of the list is approached, utility of the PL in a real auction decreases; finally, the auctioneer retains a first PL in a sorted list $$Z_{ij}^{(s)},$$

while a remaining candidate PL is eliminated; and after the candidate PL is eliminated, a remaining transaction in the T is considered as the successful transaction $W^T$; and based on the successful transaction set $W^T$, it is assumed that the first q buyers in M' are final winning buyers, a bid $B_q$ of a $q^{th}$ buyer is used as a fee $$P_{ij}^{(f)}$$

required to be paid by each winning buyer, and a total return received by a seller cannot exceed a total system budget, that is, $$P_{kj}^{(l)} \le qB_q,$$

and the auctioneer calculates, according to $$P_{kj}^{(l)} \le qB_q,$$

the return $$P_{kj}^{(l)}$$

received by the winning seller.

11. The non-transitory computer-readable storage medium according to claim 6, wherein the vehicle platoon incentive method based on the double auction further comprises: collecting, by the candidate transaction, a bid and an asking price from the PF and the PL, and creating the bidding matrix and the price asking matrix, wherein for selection of the PF and the PL, a path set affects decisions of the bid and the asking price, and for any task, different bids and asking prices are selected based on different path sets; and an impact of the path set on bidding and price asking processes is task specific.

12. The non-transitory computer-readable storage medium according to claim 11, wherein the vehicle platoon incentive method based on the double auction further comprises: determining the candidate transaction set (T) and a winning PF by calling Function(F, L, B, A), with a PF set F, a PL set L, the bidding matrix B, and the price asking matrix A as inputs, comprising: firstly creating a new PF set M from the original PF set F, wherein for any PF $pf_i \in F$, the set M comprises $$pf_i^j$$

only when $$B_i^j > 0,$$

which means that the PF $pf_i \in F$ appears in the M only when a bid $R_i \in R$ is a non-zero positive number; and then sorting PFs in the M in a non-increasing order based on the non-zero positive bid to construct a list $\mathrm{List}[M'](1 \le i \le n)$, $pf_1 \ge pf_2 \ge \ldots \ge pf_n$;

similarly, for the PL, creating a new PL set N from the original PL set L, wherein for any PL $pl_k \in L$, the set N comprises $$pl_k^j$$

only when $$A_k^j > 0;$$

and sorting PLs in the N in a non-decreasing order based on the non-zero positive asking price to construct a list List $[M'](1 \le i \le n)$, $pf_1 \ge pf_2 \ge \ldots \ge pf_n$; and determining an asking price threshold, wherein the asking price threshold is an asking price of a median PL in N' and represented by $A_\lambda$, wherein $\lambda = \lceil (m+1)/2 \rceil$;

wherein the asking price threshold $A_\lambda$ is used to construct a set $$M_q'$$

that comprises the first q PFs in M', such that $B_q \ge A_\lambda$; for each $$pf_i^j \in M_q',$$

if there is one $$A_k^j$$

that satisfies $$A_k^j < A_\lambda,$$

a PL $pl_i$ is added to a newly created set $$Z_i^j$$

comprising all PLs $$pl_k^{ij} \in N$$

that meet a condition $$A_k^j < A_\lambda,$$

and the set $$Z_i^j$$

comprises all PLs won by the $$PF\, pf_i^j$$

and for each combination $$\left(pf_i^j \in M_q', pl_k^{ij} \in N'\right)$$

that meets the above condition, one transaction (i,j,k) is created and added to the candidate transaction set T, and at the end of a cycle, each $$Z_i^j$$

is merged into a new set Z.

13. The non-transitory computer-readable storage medium according to claim 6, wherein for a successful transaction according to the vehicle platoon incentive method based on the double auction, after a candidate transaction stage, Function(Z, T) is called to confirm the successful transaction, only one of PLs won by a PF $$pf_i^j \text{ in } Z_i^j$$

is retained through elimination, and an auctioneer only retains a PL with maximum total utility, wherein PLs in the $$Z_i^j$$

are first sorted in a non-decreasing order based on asking prices of the PLs, that is, $$\text{List } \left[Z_{ij}^{(s)}\right] 1 \le s \le m),\ pl_1 \le pl_2 \le \ \ldots \ \le pl_s,$$

and when an end of the list is approached, utility of the PL in a real auction decreases; finally, the auctioneer retains a first PL in a sorted list $$Z_{ij}^{(s)},$$

while a remaining candidate PL is eliminated; and after the candidate PL is eliminated, a remaining transaction in the T is considered as the successful transaction $W^T$; and based on the successful transaction set $W^T$, it is assumed that the first q buyers in M' are final winning buyers, a bid $B_q$ of a $q^{th}$ buyer is used as a fee $$P_{ij}^{(f)}$$

required to be paid by each winning buyer, and a total return received by a seller cannot exceed a total system budget, that is, $$P_{kj}^{(l)} \le qB_q,$$

and the auctioneer calculates, according to $$P_{kj}^{(l)} \le qB_q,$$

the return $$P_{kj}^{(l)}$$

received by the winning seller.

\* \* \* \* \*